(12) United States Patent
Zaifrani et al.

(10) Patent No.: US 8,514,301 B2
(45) Date of Patent: Aug. 20, 2013

(54) ZOOM LENS APPARATUS WITH A PIEZOELECTRICALLY DRIVEN MOVEABLE PLATFORM

(76) Inventors: Silvio Zaifrani, Neve Shanan (IL); Shaul Hasson, Moshav Bet Aref (IL); Gal Peled, Kibbutz Ein Hachoresh (IL); Nir Karasikov, Haifa (IL); Eytan Rogel, Haifa (IL)

( * ) Notice: Subject to any disclaimer, the term of this patent is extended or adjusted under 35 U.S.C. 154(b) by 397 days.

(21) Appl. No.: 12/524,164

(22) PCT Filed: Jan. 24, 2008

(86) PCT No.: PCT/IL2008/000114
§ 371 (c)(1),
(2), (4) Date: Jul. 23, 2009

(87) PCT Pub. No.: WO2008/090561
PCT Pub. Date: Jul. 31, 2008

(65) Prior Publication Data
US 2010/0097498 A1    Apr. 22, 2010

Related U.S. Application Data

(60) Provisional application No. 60/897,048, filed on Jan. 24, 2007.

(51) Int. Cl.
*H04N 5/262* (2006.01)
(52) U.S. Cl.
USPC ........................................... 348/240.3
(58) Field of Classification Search
USPC ............ 348/373, 374, 375, 240.3, 345, 357
See application file for complete search history.

(56) References Cited

U.S. PATENT DOCUMENTS

| | | | |
|---|---|---|---|
| 4,597,656 A | | 7/1986 | Yamashita |
| 4,601,539 A | * | 7/1986 | Watanabe ..................... 359/824 |
| 5,146,071 A | | 9/1992 | Ookubo |
| 5,162,948 A | * | 11/1992 | Horning et al. ............... 359/694 |
| 5,453,653 A | | 9/1995 | Zumeris |
| 7,558,473 B2 | * | 7/2009 | Shin et al. ........................ 396/55 |
| 2005/0225646 A1 | * | 10/2005 | Shintani .................. 348/208.99 |
| 2006/0012887 A1 | | 1/2006 | Kano |
| 2006/0056829 A1 | * | 3/2006 | Hirota et al. ..................... 396/54 |
| 2006/0233543 A1 | | 10/2006 | Homme |
| 2006/0269262 A1 | * | 11/2006 | Shin et al. ........................ 396/55 |
| 2007/0236577 A1 | * | 10/2007 | Ke et al. .................. 348/208.99 |

FOREIGN PATENT DOCUMENTS

| | | |
|---|---|---|
| GB | 2435527 | 8/2007 |
| JP | 2004159425 | 6/2004 |
| WO | WO2006/035435 | 4/2006 |
| WO | WO2006/035447 | 4/2006 |

OTHER PUBLICATIONS

International Search Report PCT/IL08/000114, dated Nov. 3, 2008.

* cited by examiner

*Primary Examiner* — Nicholas Giles

(57) ABSTRACT

A camera having an optic axis and comprising: a lens having a lens optic axis; a platform to which the lens is mounted; a guide track to which the platform is mounted and along which the platform is moveable; wherein the guide track is rotatable between a first position in which the optic axis of the lens substantially coincides with the camera optic axis and a second position in which the lens optic axis does not coincide with the camera optic axis.

13 Claims, 17 Drawing Sheets

ZOOM LENS APPARATUS WITH A PIEZOELECTRICALLY DRIVEN MOVEABLE PLATFORM

RELATED APPLICATIONS

The present application is a US National Phase of PCT Application No. PCT/IL2008/000114, filed on Jan. 24, 2008, which claims the benefit under 35 U.S.C. 119(e) of U.S. Provisional Application 60/897,048 filed on Jan. 24, 2007, the disclosure of which is incorporated herein by reference.

FIELD OF THE INVENTION

The invention relates to cameras and in particular to cameras having a zoom function.

BACKGROUND OF THE INVENTION

Modern cameras generally provide an auto focus (AF) function and a zoom function and comprise a photosurface such as a CCD or CMOS photosurface on which scenes imaged by the camera are recorded. To provide the AF and zoom functions, a camera generally comprises a first lens or lens system, hereinafter generically referred to as an "auto focus" lens (AF lens), that functions to focus images on the photosurface and a second lens or lens system, hereinafter referred to generically as a "zoom lens", that provides a zoom function.

The AF lens and the zoom lens are generally mounted to first and second platforms respectively, referred to for convenience as AF and zoom platforms, of a lens transport system so that the optic axes of the AF and zoom lenses are coincident along a common camera optic axis. A suitable motor or actuator comprised in the transport system moves the zoom and AF platforms to position the zoom and AF lenses in various desired telephoto and wide-angle configurations and provide the camera with zoom and focusing functions for imaging a scene.

SUMMARY OF THE INVENTION

An aspect of some embodiments of the invention relates to providing a camera comprising a new lens transport system having a zoom platform and/or an AF platform for moving and positioning a zoom lens and/or an AF lens respectively comprised in the camera.

An aspect of some embodiments of the invention relates to providing a lens transport system comprising at least one lens platform coupled to at least one relatively thin ribbon, hereinafter referred to as a "drive ribbon", of material configured to be coiled selectively onto and off from a spool, hereinafter a "ribbon spool". Optionally, the at least one lens platform comprises a zoom lens platform having a zoom lens mounted thereto. The zoom lens platform is moved along the camera optic axis by coiling the drive ribbon onto the spool or uncoiling the drive ribbon from the spool.

In an embodiment of the invention, the lens platform is coupled to two drive ribbons bands each coiled and uncoiled from a different ribbon spool. Optionally the drive ribbons are substantially mirror images of each other. In an embodiment of the invention, each ribbon spool is coupled to at least one piezoelectric motor that is controllable to rotate the spool to selectively coil and uncoil the drive ribbon to which it is connected. A lens transport system comprising a drive ribbon to move a lens platform in accordance with an embodiment of the invention is referred to as a "ribbon drive transport system".

An aspect of some embodiments of the invention relates to providing a lens transport system, hereinafter a "foldaway transport system", having a zoom lens comprised in a platform, a zoom lens platform, that is mounted to at least one guide rail along which the zoom lens platform is moveable. When the zoom lens is not in use, the zoom lens platform and the at least one guide rail are folded optionally into the body of a camera to which the system is mounted. When the zoom lens is to be used, the foldaway rail and the zoom platform mounted to the rail are folded out from the camera body and into an orientation in which the optic axis of the zoom lens coincides with the optic axis of an AF lens comprised in the foldaway transport system or camera. Optionally, at least one piezoelectric motor is mounted to the zoom lens platform and coupled to the at least one guide rail to control motion of the zoom lens along the guide rail.

An aspect of some embodiments of the invention, relates to providing a lens transport system comprising a lens platform mounted to or formed as part of a telescope turret comprising a plurality of segments. The segments can be telescoped in, to nest one inside the other so that a length of the turret is optionally substantially equal to about a length of a longest segment of the plurality of segments. The segments can be telescoped out to a maximum length substantially equal to a sum of the lengths of the segments. A first segment of the plurality of segments is formed having a drive rail, which is received by a slot in a second, adjacent segment. In an embodiment of the invention, a piezoelectric motor mounted to the second segment is coupled to the drive rail and is controllable to apply force to the drive rail to move the first segment into or out from the second segment, that is, to respectively telescope the first segment into or out from the second segment.

A lens transport system, in accordance with an embodiment of the invention comprising a telescoping turret having at least one first segment formed having a drive rail and a matching at least one second segment having a slot that receives the drive rail is referred to as a "rail and slot" drive system.

An aspect of some embodiments of the invention relates to providing a lens transport system, hereinafter referred to as a "linear bearing transport system", comprising a lens platform supported by a linear array of bearings having an array axis that enables relatively free motion of the platform parallel to the array axis. The linear array of bearings optionally comprises a plurality of ball bearings, each of which seats in and is sandwiched between a first groove formed in a region or appendage of the lens platform and a second groove formed in a region of a transport system support frame or housing to which the lens platform is mounted. Optionally, the grooves are V-shaped "V-grooves". The ball bearing rolls along the V-grooves when the lens platform moves parallel to the array axis.

In an embodiment of the invention, the lens transport system comprises a piezoelectric motor controllable to apply force to a region of the support frame or the lens platform to control motion and positioning of the lens platform along the array axis. In an embodiment of the invention, the piezoelectric motor is configured to apply force that presses the first and second V-grooves towards each other to maintain the bearings sandwiched between the V-grooves.

In an embodiment of the invention, the piezoelectric motor is configured to generate a torque that operates to rotate the lens platform about the array axis. The torque causes the lens platform to contact a low friction surface along which the lens platform moves when the lens platform translates along the bearing array axis. Contact with the low friction surface generates torque that opposes the torque caused by the piezoelectric motor to maintain the lens platform stably oriented. Optionally, the low friction surface is a surface of a guide rail that is parallel to the bearing array axis.

There is therefore provided in accordance with an embodiment of the invention, a camera having an optic axis and comprising: a lens having a lens optic axis; a platform to which the lens is mounted; a guide track to which the platform is mounted and along which the platform is moveable; wherein the guide track is rotatable between a first position in which the optic axis of the lens substantially coincides with the camera optic axis and a second position in which the lens optic axis does not coincide with the camera optic axis. Optionally, in the second position the optic axis of the lens is substantially perpendicular to the camera optic axis. Additionally or alternatively, the guide track optionally comprises two guide rails.

In some embodiments of the invention, the platform comprises at least one piezoelectric motor coupled to a guide rail and controllable to apply force to the guide rail that moves the platform along the track. Optionally, the at least one piezoelectric motor comprises two piezoelectric motors each coupled to a different rail.

In some embodiments of the invention, the at least one rail comprises fiducial markings useable to monitor position of the platform along the track. Optionally, the camera comprises at least one photosensor that generates signals responsive to the fiducial markings useable to monitor position of the platform.

There is further provided in accordance with an embodiment of the invention, a camera having an optic axis and comprising: a lens; a platform to which the lens is mounted; at least one spool having an axis of rotation about which the spool is rotatable; a ribbon of material connected to each of the at least one spool so that the spool is rotatable about its axis of rotation to selectively coil the ribbon onto or off from the spool; wherein the ribbon is connected to the platform and coiling of the ribbon onto or off the spool, moves the lens along the camera optic axis. Optionally, the platform comprises a segment of a telescope turret comprising a plurality of segments that can be telescoped to nest one inside the other. Additionally or alternatively, the ribbon optionally has a convex and concave side.

In some embodiments of the invention, the camera comprises at least one piezoelectric motor coupled to the spool and controllable to selectively rotate the pool to selectively coil the ribbon onto or off from the spool. In some embodiments of the invention, the at least one spool comprises two spools. Optionally, the two spools are mirror images of each other in a plane through the optic axis.

There is further provided in accordance with an embodiment of the invention, a camera having an optic axis and comprising: a lens; a telescoping turret comprising a first segment nestable in a second segment, to which first segment the lens is mounted, and wherein the first segment has a rail parallel to the camera optic axis that is received by a slot in the second segment; and a piezoelectric motor mounted to the second segment coupled to the rail and controllable to apply force to the rail to selectively move the first segment relative to the second segment selectively in either direction along the camera optic axis.

There is further provided in accordance with an embodiment of the invention, a camera having an optic axis and comprising: a first lens platform having a first lens; a linear array of bearings coupled to the first platform and having a bearing array axis parallel to the optic axis along which the first platform moves when the bearings rotate; a linear guide rail parallel to the array axis; a torque generator that generates torque which rotates the platform about the bearing array axis so that the platform is pressed to the linear guide rail; and a motor controllable to move the platform selectively in either direction along the bearing array axis.

Optionally, the motor comprises a piezoelectric motor having a friction nub and a resilient element that presses the friction nub to the surface, wherein the motor is controllable to excite vibrations in its friction nub that apply force to the surface to selectively move the platform in either direction along the array axis. Optionally, the surface is a surface that moves with the platform. Optionally, the surface is separate from the platform. Optionally, the surface does not move when the platform moves. Additionally or alternatively, the motor is optionally mounted to the platform and moves with the platform. Optionally, the platform comprises a first elastic element that presses the motor to the platform and a second elastic element separate from the first element that presses the friction nub to the surface.

In some embodiments of the invention, the torque generator comprises the motor and resilient element and force between the friction nub and surface generated by the resilient element generates the torque.

In some embodiments of the invention, the camera comprises a second lens platform having a second lens, which second platform is mechanically coupled to the first platform so that motion and position of the first platform along the optic axis controls motion and position of the first platform along the optic axis. Optionally, the camera comprises a cam that mechanically couples the second platform to the first platform. Optionally, the cam is formed having first and second slots and the first and second platform respectively comprise first and second parallel pins perpendicular to the optic axis that seat in the first and second slots and about which pins the cam is rotatable. Additionally or alternatively, the camera optionally comprises a fixed shaft having an axis about which the cam is rotatable. Additionally or alternatively, the first and second slots are optionally straight slots.

There is further provided in accordance with an embodiment of the invention, a transport system for moving and positioning an object comprising: a platform to which the object is mountable; a linear array of bearings coupled to the platform and having a bearing array axis along which the platform moves when the bearings rotate; a linear guide parallel to the array axis; a torque generator that generates torque which rotates the platform about the bearing array axis so that the platform is pressed to the linear guide; and a motor controllable to move the platform selectively in either direction along the bearing array axis.

BRIEF DESCRIPTION OF FIGURES

Non-limiting examples of embodiments of the invention are described below with reference to figures attached hereto. In the figures, which are listed following this paragraph, identical structures, elements or parts that appear in more than one figure are generally labeled with a same reference numeral in all the figures in which they appear. Dimensions of components and features shown in the figures are chosen for convenience and clarity of presentation and are not necessarily shown to scale.

DETAILED DESCRIPTION OF EXEMPLARY EMBODIMENTS

Figure 1A:
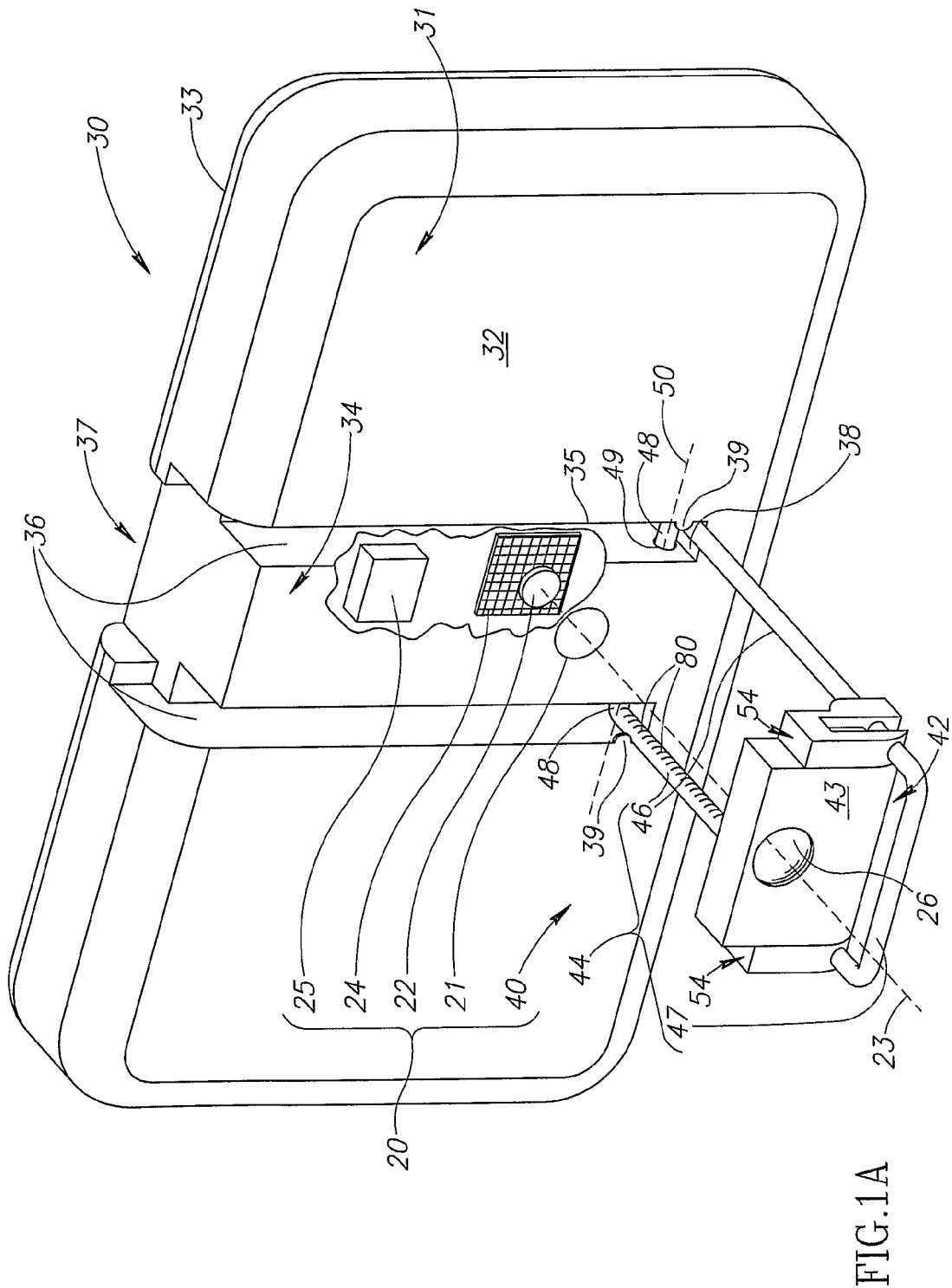
FIG. 1A schematically shows a perspective view of a camera having a foldaway lens transport system with the foldaway system unfolded and ready for use, in accordance with an embodiment of the invention.

FIG. 1A schematically shows a perspective, partially view of a camera 20 having a foldaway lens transport system 40 with the foldaway system unfolded and ready for use, in accordance with an embodiment of the invention.

Figure 1B:
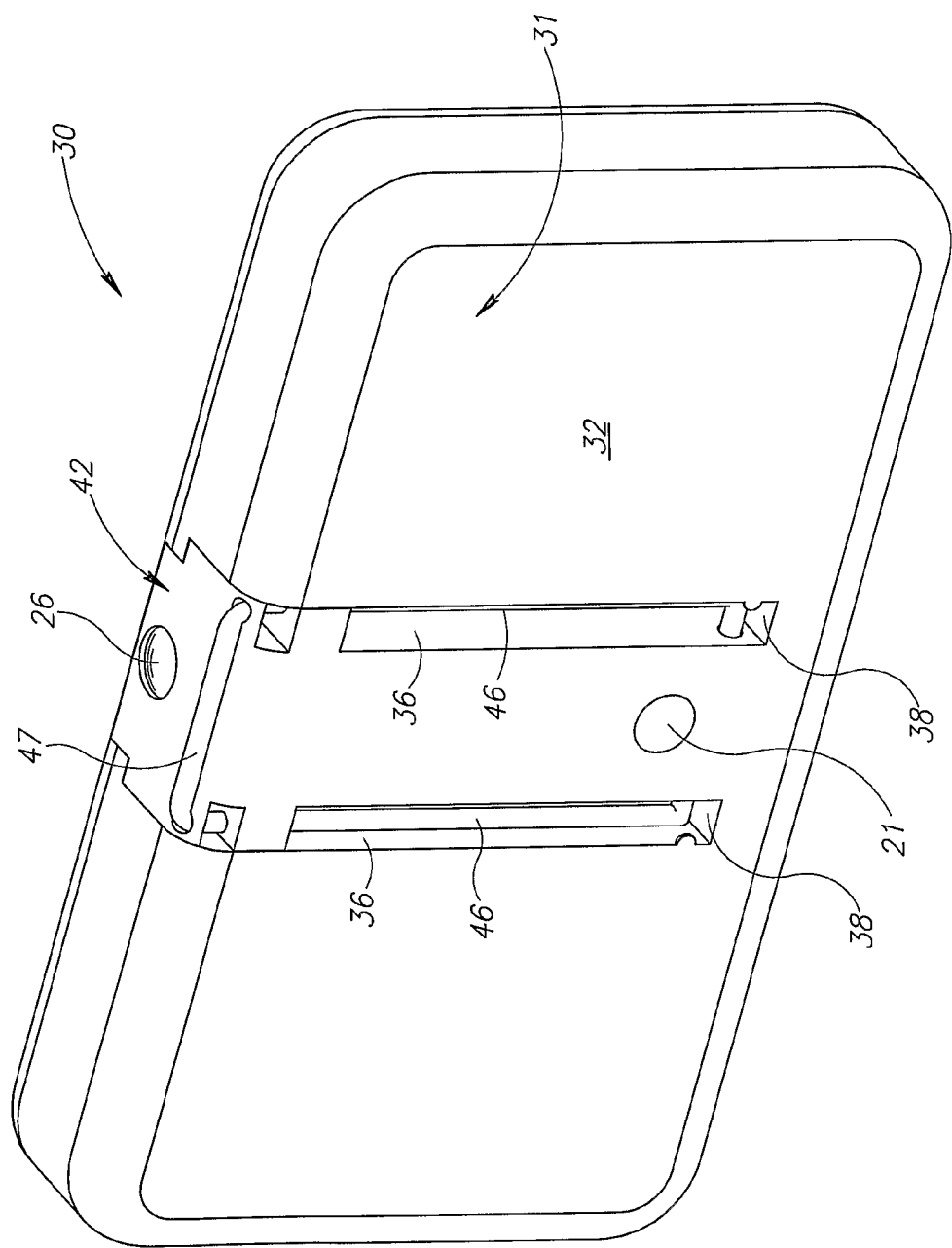
FIG. 1B schematically shows a perspective view of the camera shown in FIG. 1A with the lens transport system folded away, in accordance with an embodiment of the invention.

Camera 20 is optionally comprised in a cellular telephone 30 and is schematically shown by way of example in FIGS. 1A and 1B mounted in a "backside" 31 of a casing 32 that houses a cellular phone. Casing 32 is partially cutaway to show features of camera 20 that would otherwise be hidden. Controls for camera 20 are assumed to be located on the front, "phone side" 33 of casing 32.

Camera 20 comprises a camera aperture 21 formed in casing 32 through which light from a scene being imaged by camera 20 enters casing 32 and a suitable optical system represented by a focusing lens 22 and having an optic axis 23 that focuses the light on a photosurface 24, such as a CCD or CMOS photosurface. Focusing lens 22 is optionally mounted to a suitable AF platform (not shown) moveable along optic axis 23. Any of various moveable platforms known in the art may be used in the practice of the invention for mounting focusing lens 22. Optionally, the movable AF platform comprises a moveable platform described in PCT publications WO2006/035435 or WO2006/035447, the disclosures of which are incorporated herein by reference. A controller 25 comprised in camera 20 controls the position of the AF platform to focus light from a scene being imaged by camera 20 onto photosurface 24.

In accordance with an embodiment of the invention, a zoom lens 26 for providing camera 20 with zoom functions is mounted to a zoom lens platform 42 of foldaway transport system 40, which is configured to move along a guide track 44, optionally comprising two parallel guide rails 46. Optionally, guide track 44 is U-shaped and guide rails 46 are connected by a cross piece 47. Optionally, guide track 44 is formed from, at least in part, a metal. Optionally, each rail 46 has a circular cross section. In some embodiments of the invention, guide track 44 comprises a wire-form appropriately bent to provide guide rails 46.

Guide track 44 is coupled to casing 32, optionally by mirror image hook ends 48 that are received by matching holes 49, only one is indicated in FIG. 1A in a central section 34 of casing 32, so that guide track 44 is rotatable about an axis 50 from an active position shown in FIG. 1A to a passive position shown in FIG. 1B. In the active position guide rails 46 are substantially parallel to optic axis 23 and the optic axis is substantially coincident with the optic axis of lens 26.

In accordance with an embodiment of the invention, when camera 20 or its zoom functions are not in use, zoom platform 42 is in the passive position. In the passive position zoom platform 42 is located along guide track 44 at a position closest to cross piece 47 and the guide track and zoom platform are rotated about axis 50 and nested in recesses in casing 32, as schematically shown in FIG. 1B. Recesses 36 are formed in the casing to receive guide rails 46 and a recess 37 is formed in the casing to receive zoom platform 42. Optionally, guide track 44 and with it zoom platform 42 are manually moved between the active and passive positions.

In the active position (FIG. 1A), each guide rail 46 is optionally supported by at least a portion of a bottom surface 38 of recess 36 that receives the guide rail in the passive position of guide track 44. Optionally, guide rail 46 is locked in the active position by an elastically deformable retaining ear 39 that protrudes from an edge 35 of recess 36 to engage the guide rail. In moving guide track 44 from the active to the passive position, force that provides torque to rotate the guide track, forces each guide rail 46 against its retaining ear 39 elastically deforming the ear sufficiently so that the guide rail rotates past it, after which the ear snaps back to its normal undeformed configuration. Guide track 44 and zoom platform 42 are optionally locked in the passive position by a snap lock (not shown), such as an elastic latch and matching catch, configured in accordance with any of many configurations known in the art. The snap lock is unlocked when sufficient threshold torque is applied to guide track 44 to rotate it to the active position. In moving from the passive position (FIG. 1B) to the active position, guide rails similarly contact retaining ears 39, which deform to let the guide rails rotate past them and then snap back to engage the guide rails and maintain the guide rails and thereby guide track 44 "locked" in the active position.

Figure 1C:
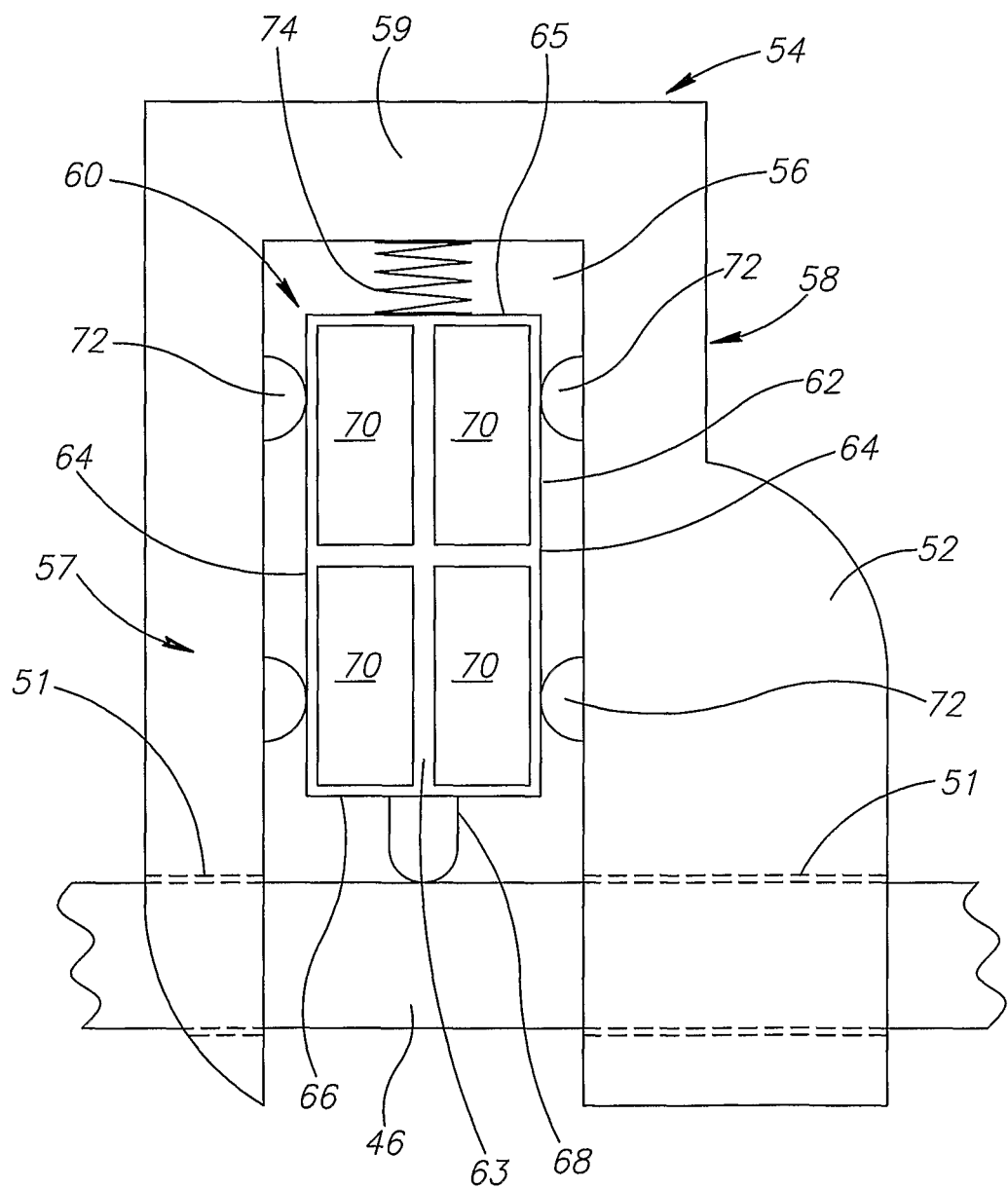
FIG. 1C shows an enlarged schematic view of a portion of foldaway lens transport system, in accordance with an embodiment of the invention.

Zoom platform 42 comprises a central lens holder 43 to which zoom lens 26 is mounted and two lateral, optionally mirror image, wings 54. Details of wings 54 are shown in FIG. 1C. Each wing 54 is formed having a cavity 56 that holds a piezoelectric motor 60. Cavity 56 is defined at least in part by front and back sidewalls 57 and 58 respectively and a top wall 59. Sidewalls 57 and 58 are formed having holes 51, schematically shown in dashed lines, that receive a rail 46 of guide track 44. Sidewalls 57 and 58 and holes 51 are formed using any of various materials and methods known in the art and having dimensions so that zoom platform 42 can be moved relatively easily along guide rails 46 while maintaining relatively accurate and stable registration between the platform and the guide rails and alignment of zoom lens 26 with optic axis 23 (FIG. 1A).

By way of example, to enhance accurate motion and positioning of zoom platform 42 along guide rails 46, optionally back side wall 58 of each wing 54 has a trailing extension 52 that increases the length of hole 51 in the back sidewall. The increased length of hole 51 in back sidewall 58 improves resistance of zoom platform 42 to undesired rotation of the zoom platform relative to guide rails 46. Optionally, zoom platform 42 is formed from a suitable plastic, optionally by injection molding.

Piezoelectric motor 60 is optionally a motor of a type described in U.S. Pat. No. 5,453,653 the disclosure of which is incorporated herein by reference. The motor comprises a thin rectangular piezoelectric vibrator 62 having front and back relatively large planar face surfaces 63, of which only front face surface 63 is seen in the perspective of the figure, relatively long edge surfaces 64 and relatively short top and bottom edge surfaces 65 and 66 respectively. A friction nub 68 is bonded to bottom edge surface 66. Optionally, four quadrant electrodes 70 are located in a symmetric checkerboard pattern on front face surface 63. A single large electrode (not shown) is located on back surface 63. Vibrations in vibrator 62 and thereby in friction nub 68 are excited by electrifying quadrant electrodes 70 relative to the large electrode using any of various voltage configurations as is known in the art.

Piezoelectric motor 60 is held in cavity 46 using any of various methods and devices known in the art so that friction nub 68 is resiliently pressed to guide rail 46. In FIG. 1C piezoelectric motor 60 is schematically shown held by grasping "buttons" 72 that press against long edges 64 of the piezoelectric motor. Optionally, buttons 72 are shaped and formed so that they press against edges 64 with resilient force. Optionally, the buttons press against the long edges at regions of the edges that are nodal regions of the vibrator at an operating frequency of the vibrator. An elastic element, schematically represented by a spring 74, urges motor 60 in a direction so that friction nub 68 resiliently presses against rail 46.

Controller 25 (FIG. 1A) controls the voltage configurations and thereby vibrations in friction nub 68 to apply force to guide rails 46 that operate to move and position zoom platform 42 and therefore zoom lens 26 along the guide rails. The controller controls position of zoom platform 42 to selectively provide desired wide angle or telephoto imaging of a scene. For a given wide angle or telephoto position of zoom platform 42 and thereby zoom lens 26, the controller controls position of the AF platform to which focusing lens 22 (FIG. 1A) is mounted responsive to the position of zoom lens 26 and location of a scene being imaged by camera 20 to focus light from the scene on photosurface 24 (FIG. 1A).

Optionally, controller 25 transmits electrical signals for controlling vibrations of piezoelectric motors 60 via rails 46. In some embodiments of the invention, crosspiece 47 is conductive and both rails 46 are electrically connected and same signals control both motors 60. In some embodiments of the invention, at least a part of cross piece 47 is non-conductive, guide rails 46 are electrically isolated from each other and controller 25 optionally transmits different signals to each piezoelectric motor 60. For example, signals sent to one piezoelectric motor 60 may be delayed with respect to signals transmitted to the other piezoelectric motor 60 to compensate for differences in coupling forces between wings 44 and their respective guide rails 46.

Optionally, camera 20 is provided with a monitoring system that monitors position of zoom platform 42 along guide track 44. Any of various position monitoring sensors and systems known in the art may be used to monitor position of the zoom platform. Optionally, the monitor system comprises fiducial markings 80 located on at least one guide rail 46 and at least one photosensor for sensing motion of the fiducial markings relative to zoom platform 42. Optionally, fiducial markings 80 that are located on one of guide rails 46 is located on an inside surface region of the guide rail facing the other guide rail. Optionally, the at least one photosensor comprises at least one photosensor located in or on central portion 43 of zoom platform 42.

Figure 1D:
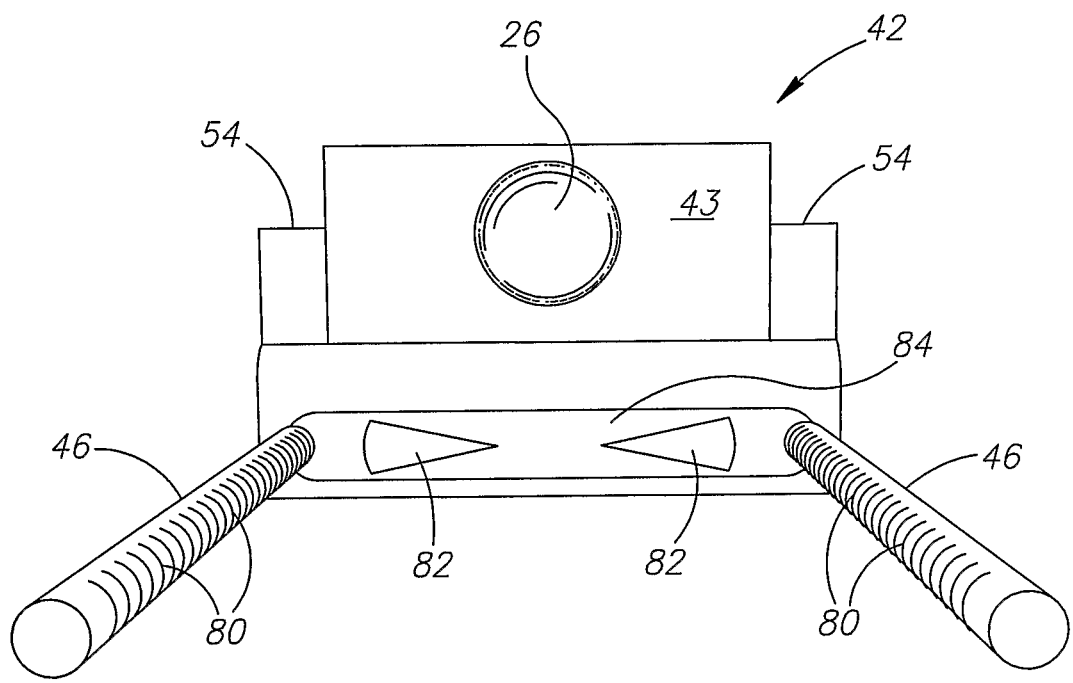
FIG. 1D schematically shows a perspective view of a lens platform and guide rails comprised in the foldaway transport system, shown in FIGS. 1A and 1B, in accordance with an embodiment of the invention.

FIG. 1D schematically shows an enlarged view of zoom platform 42 and guide track 44 as seen from the back of the zoom platform from a position located substantially at aperture 21 (FIG. 1A). By way of example, each guide rail 46 is marked with fiducial markings 80 and central section 43 of zoom platform 42 comprises two photosensors 82 mounted in a recess 84 in the central section.

Figure 2A:
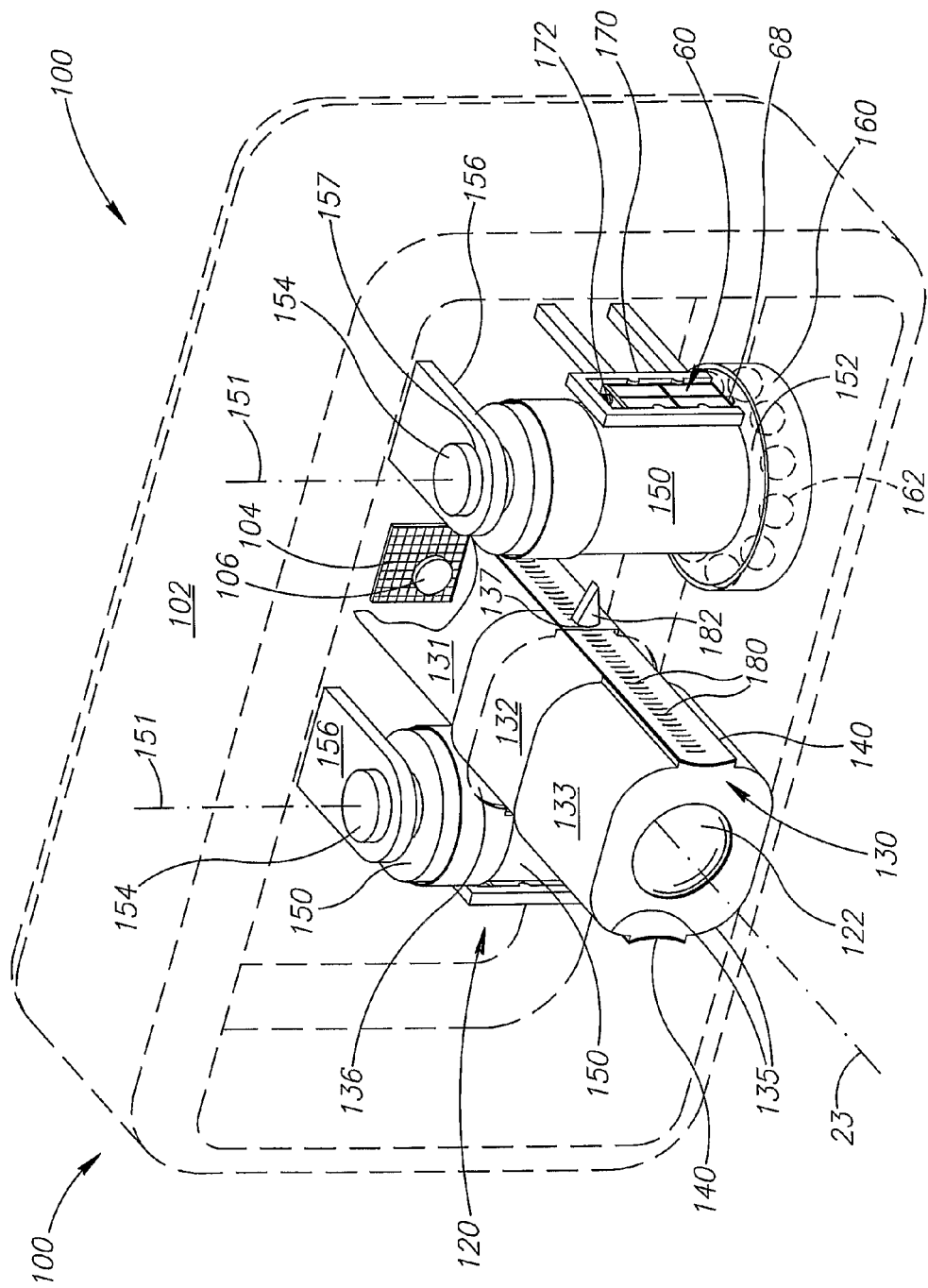
FIGS. 2A and 2B schematically show a camera comprising a ribbon drive transport system mounted with a zoom lens, with the zoom lens located at different positions along the camera optic axis, in accordance with an embodiment of the invention.

FIG. 2A schematically shows a ribbon drive camera 100 comprising a ribbon drive transport system 120 for moving and positioning a zoom lens 122, in accordance with an embodiment of the invention. For convenience of presentation, internal features of camera 100 are shown in solid lines as if seen though a casing 102, shown in dashed lines, of the camera. Ribbon drive camera 100 optionally comprises a photosurface 104 mounted in camera casing 102, a focusing lens 106 mounted to an AF platform (not shown). Ribbon drive transport system 120 comprises a telescope turret 130, in accordance with an embodiment of the invention, which is partially cutaway to show photosurface 104 and AF lens 106.

Figure 2B:
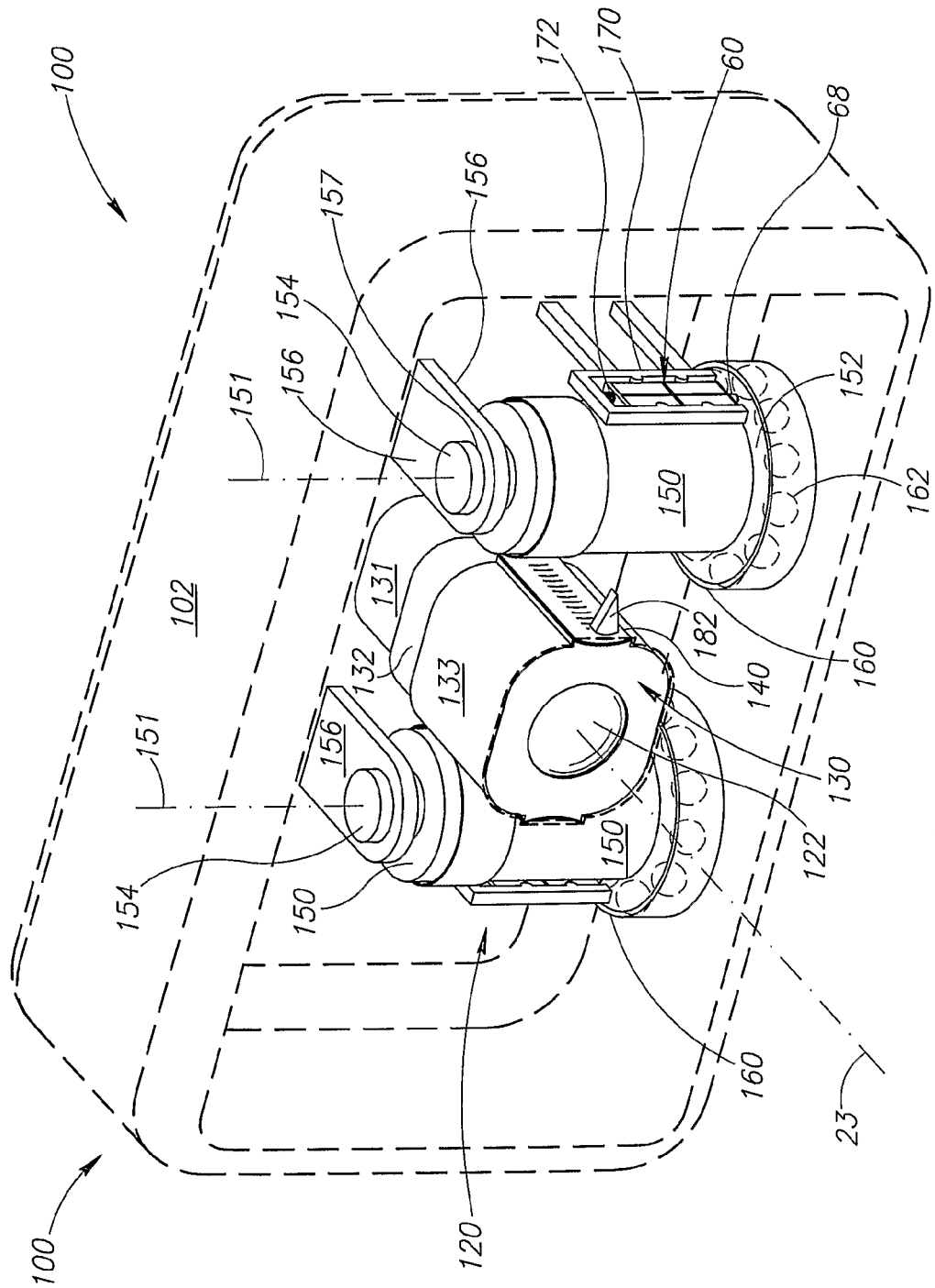

Telescope turret 130 comprises a plurality of segments, optionally three segments 131, 132 and 133, that can be telescoped to nest one inside the other. Segment 131, optionally a smallest segment, is optionally fixed relative to camera casing 102 and photosurface 104. Segment 133, optionally a largest segment, and also referred to as zoom platform 133, is mounted with zoom lens 122. Telescope turret 130 may be telescoped out from camera casing 102 through a hatch 136 formed in the casing to a maximum length optionally equal to about a sum of the lengths of segments 131, 132 and 133. Telescope turret 130 may be telescoped in to a length optionally substantially equal to a minimum length of a longest segment. FIG. 2B schematically shows telescope turret 130 telescoped in to its shortest length. By way of example, segments 131, 132 and 133 each have a substantially rectangular cross section with filleted corners 135. The substantially rectangular cross sections of segments 131, 132 and 133 aid in stabilizing the segments against rotation about optic axis 23. Focusing lens 106, zoom lens 122 optionally share a common optic axis 23.

In accordance with an embodiment of the invention, ribbon transport system 120 comprises at least one relatively thin ribbon 140 of material, i.e. a drive ribbon 140, attached to zoom platform 133 and to a ribbon spool 150 having an axis of rotation 151 about which the spool is relatively freely rotatable. By way of example, zoom platform 133 is attached to two mirror image drive ribbons 140, each optionally attached to its own associated ribbon spool 150.

Each ribbon 140 is formed from a material that substantially does not stretch or compress in a direction along the ribbon length and can be coiled onto or off from its associated spool 150 by rotating the spool about its axis of rotation 151 in an appropriate direction. The ribbon can be coiled and uncoiled in much a same manner that a graduated ribbon of a tape measure can be coiled into or out from a tape measure casing and sections that are uncoiled are relatively stiff, resist bending and are not prone to kinking. Optionally, ribbons 140 are formed from a metal. Optionally ribbons 140 are formed from a suitable plastic or composite material such as a plastic reinforced by fibers that provide the plastic with suitable mechanical integrity and stiffness. Optionally, as in some tape measures, a cross section of a drive ribbon 140 perpendicular to its length is arced with a concave side of the arc of that portion of the ribbon coiled onto ribbon spool 150 facing the spool. The arced cross section adds to the stiffness of straight sections of the ribbon that are uncoiled from its ribbon spool.

An extent to which telescope turret 130 extends along optic axis 23, and thereby where along optic axis 23 zoom platform 133 and zoom lens 122 are located, is controlled in accordance with an embodiment of the invention by coiling drive ribbons 140 off from their respective spools 150 or onto the spools. Uncoiling drive ribbons 140 from their spools 150 extends the drive ribbons along optic axis 23 thereby telescoping out and extending telescope turret 130 along the optic axis and moving zoom platform 133 and zoom lens 122 away from photosurface 104 (FIG. 2A). Coiling the drive ribbons onto the spools retracts the ribbons, shortens a distance that the ribbons extend along optic axis 23 thereby telescoping in and retracting telescope turret 130 and moving lens 122 towards photosurface 104.

Any of various methods and devices may be used to mount spools 150 in camera 100 so that the spools are freely rotatable about their respective axes 151. In accordance with an embodiment of the invention, each spool 150 comprises an annular flange 152 that fits into a bearing collar 160 and optionally rests on a suitable bearing within the collar, such as for example a plurality of roller bearings 162, shown in dashed lines, caged within the collar. Optionally, each spool 150 comprises a shaft 154 optionally received in a hole 157 formed in a restraining plate 156 attached to casing 102. Restraining plate 156 is optionally at least partially formed from a low friction material, and/or the surface of hole 157 is lined or mounted with a low friction bearing to reduce friction between shaft 154 and the surface of hole 157. Optionally, contact between shaft 154 and restraining plate 156 and/or coupling between bearing collar 160 and flange 152 accurately maintains axis of rotation in position.

According to an embodiment of the invention, at least one piezoelectric motor 60, similar to piezoelectric motor 60 shown in FIG. 1C, is coupled to annular flange 152 of each spool to control rotation of the spool. Piezoelectric motor 60 is coupled to annular flange by resiliently urging the motor to the flange so that friction nub 68 of the motor presses against a surface region of the flange. Any of various devices and methods known in the art may be used to resiliently urge piezoelectric motor 60 to flange 152. By way of example, in FIGS. 2A and 2B piezoelectric motor 60 is schematically shown mounted to a "horseshoe" frame 170 having an elastic member 172 that urges the motor towards flange 152 so that friction nub 68 presses resiliently against the flange. Optionally, pressure of friction nub 68 on flange 152 at least partially contributes force that maintains the flange seated on bearings 162.

A controller (not shown) controls piezoelectric motors 60 to selectively reel out and reel in drive ribbons 140 and respectively telescope out and telescope in turret 130 and position zoom lens 122 along optic axis 23 to provide a desired zoom or telephoto image of a scene being imaged by camera 100. For a given wide angle or telephoto position of zoom platform 133 and thereby zoom lens 122, the controller controls position of the AF platform (not shown) to which focusing lens 106 is mounted responsive to the zoom lens position and location of a scene being imaged by camera 100 to focus light from the scene to on photo surface 104.

Optionally, camera 100 is provided with a monitoring system that monitors position of zoom platform 133 and thereby zoom lens 122. Any of various methods and devices known in the art may be used to configure the monitoring system. Optionally, the monitor system comprises fiducial markings 180 located on each drive ribbon 140 and a photodetector 182 to sense motion of the fiducial markings. Optionally, the photodetector is mounted along edge 137 of hatch 136 in a region of the edge close to ribbon 140 that it monitors.

In some embodiments of the invention, each photodetector 182 is a component of a moiré encoder and fiducial markings 180 are rulings of a first grating that are used in conjunction with a second, stationary grating (not shown) that filters light entering photodetector 182 to form a moiré pattern of fringes. Motion of the fringes are sensed by photodetector 182 and used to monitor motion of drive ribbon 140 and position of zoom lens 122. Optionally, the moiré encoder is a conventional moiré encoder and the moiré pattern a conventional moiré pattern. Optionally, the moiré encoder is an encoder described in PCT publication WO2006/035447 and the moiré pattern comprises a moiré pattern having a first region of fringes phase shifted by optionally 90° relative to fringes of a second region of the moiré pattern as described below. Optionally, the monitoring systems generate signals that are used in a closed loop control system to control piezoelectric motors 60.

Figure 3A:
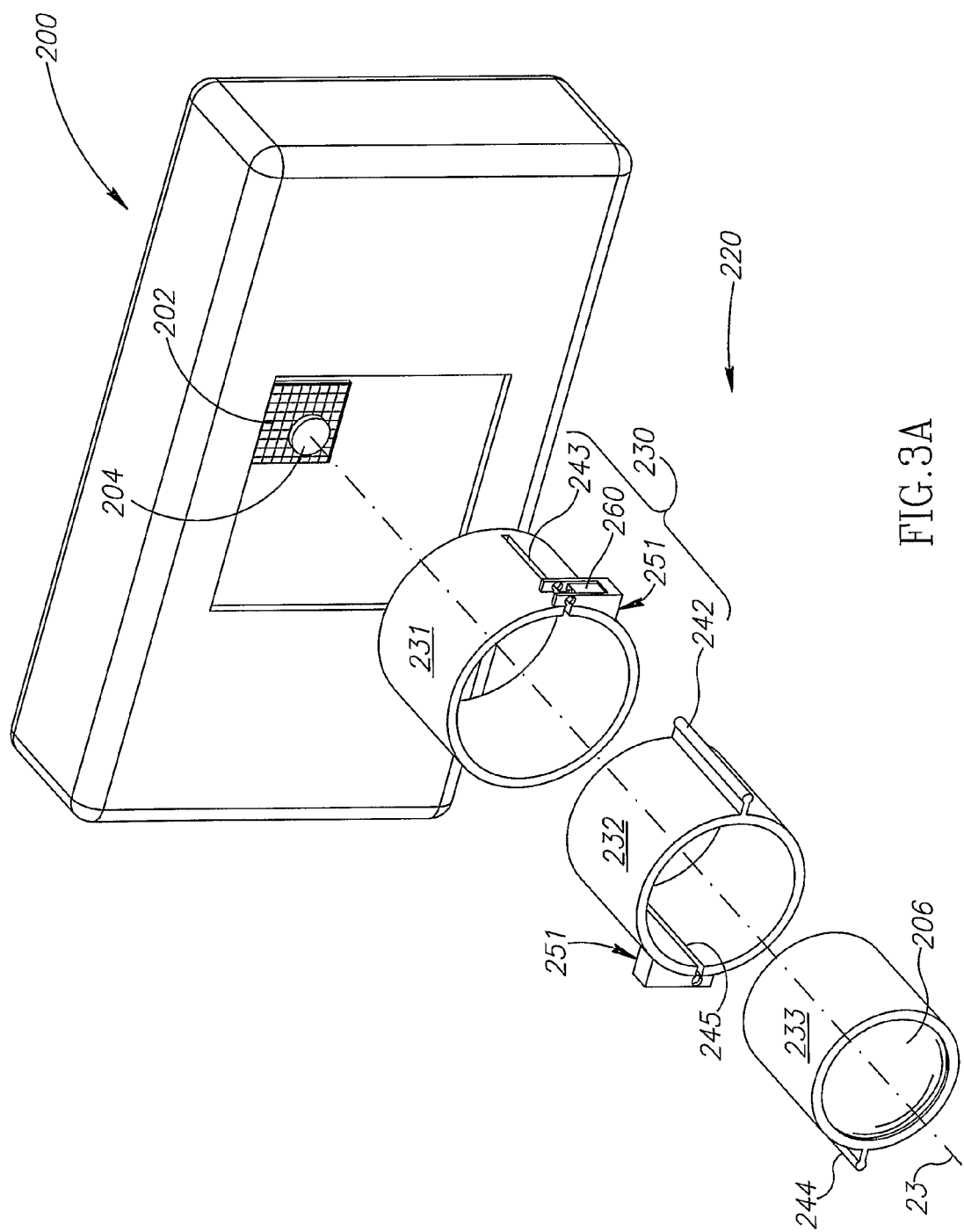
FIGS. 3A and 3B schematically show a camera comprising a rail and slot drive transport system mounted with a zoom lens with the zoom lens located at different positions along the camera optic axis, in accordance with an embodiment of the invention.
Figure 3B:
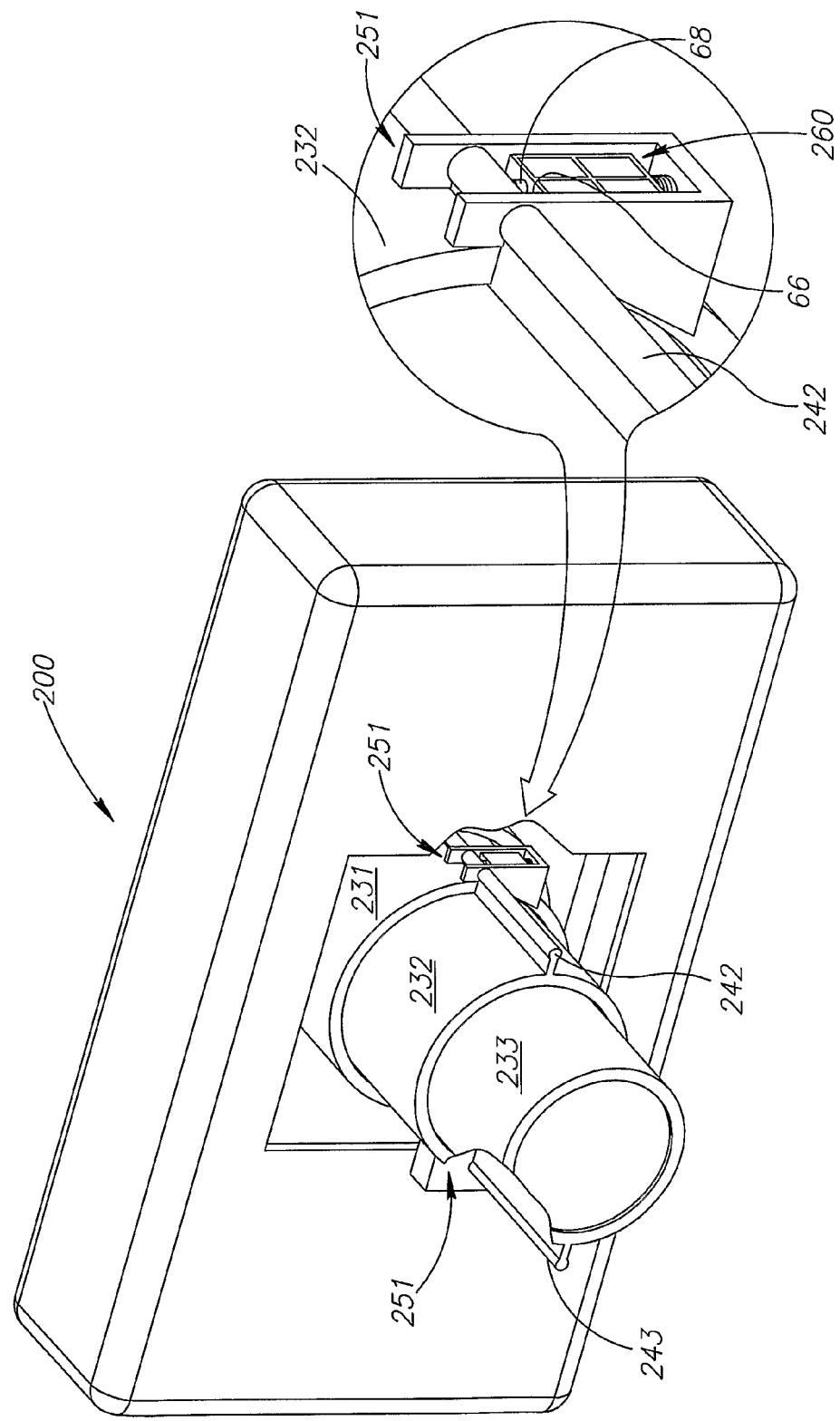

FIGS. 3A and 3B schematically show an exploded perspective view and an assembled partially cutaway perspective view respectively of a camera 200 comprising a rail and slot lens transport system 220, in accordance with an embodiment of the invention.

Camera 200 comprises a photosurface 202 and an AF lens 204 having an optic axis indicated by a dashed line 23. Rail and slot transport system 220 comprises a telescope turret 230 having a plurality of segments, shown by way of example as three segments 231, 232 and 233 that can be telescoped to nest one inside the other. Segment 233, also referred to as zoom platform 233, is mounted with a zoom lens 206. Optionally, segments 231, 232 and 233 have circular cross sections.

Segment 232 comprises a drive rail 242 that is received by a rail slot 243 formed in segment 231 and segment 233 is formed with a drive rail 244 that is received by a rail slot 245 in segment 232. Optionally, in segment 232 rail slot 245 and drive rail 242 are located opposite each other. The assembled view of camera 200 shown in FIG. 3B schematically shows drive rail 242 of segment 232 located in slot 243 of segment 231. Drive rail 244, of segment 233 is similarly located in slot 245 of segment 232.

Segment 231 comprises a motor mount 251 mounted with a piezoelectric motor 260. Details of motor mount 251 and piezoelectric motor 260 are shown in FIG. 3B. Optionally, piezoelectric motor 260 is similar to piezoelectric motor 60 shown in FIGS. 1A and 1D and comprises a thin rectangular piezoelectric vibrator having a friction nub 68 on a short edge surface 66 thereof. Piezoelectric motor 260 is held in motor mount 251 using any of various mounting methods and device known in the art so that its friction nub 68 resiliently presses against drive rail 242 of segment 232. Piezoelectric motor 260 is controlled by a controller (not shown) to generate vibrations in its friction nub 68 that apply force to move drive rail 242 and thereby segment 232 selectively in either direction along optic axis 23.

Segment 232, similarly comprises a motor mount 251 having a piezoelectric motor 260 (not shown) mounted therein that is held in the motor mount so that a friction nub of the motor presses resiliently against drive rail 243 of segment 233. The controller controls the piezoelectric motor in motor mount 251 of segment 2332 to apply force to drive rail 243 that moves segment 233 selectively in either direction along optic axis 23.

By appropriately controlling piezoelectric motors 260 the controller telescopes in or telescopes out telescope turret 230 to position zoom lens 206 at a desired position along optic axis 23 to provide a desired wide angle or zoom image of a scene being imaged by camera 200.

Figure 4A:
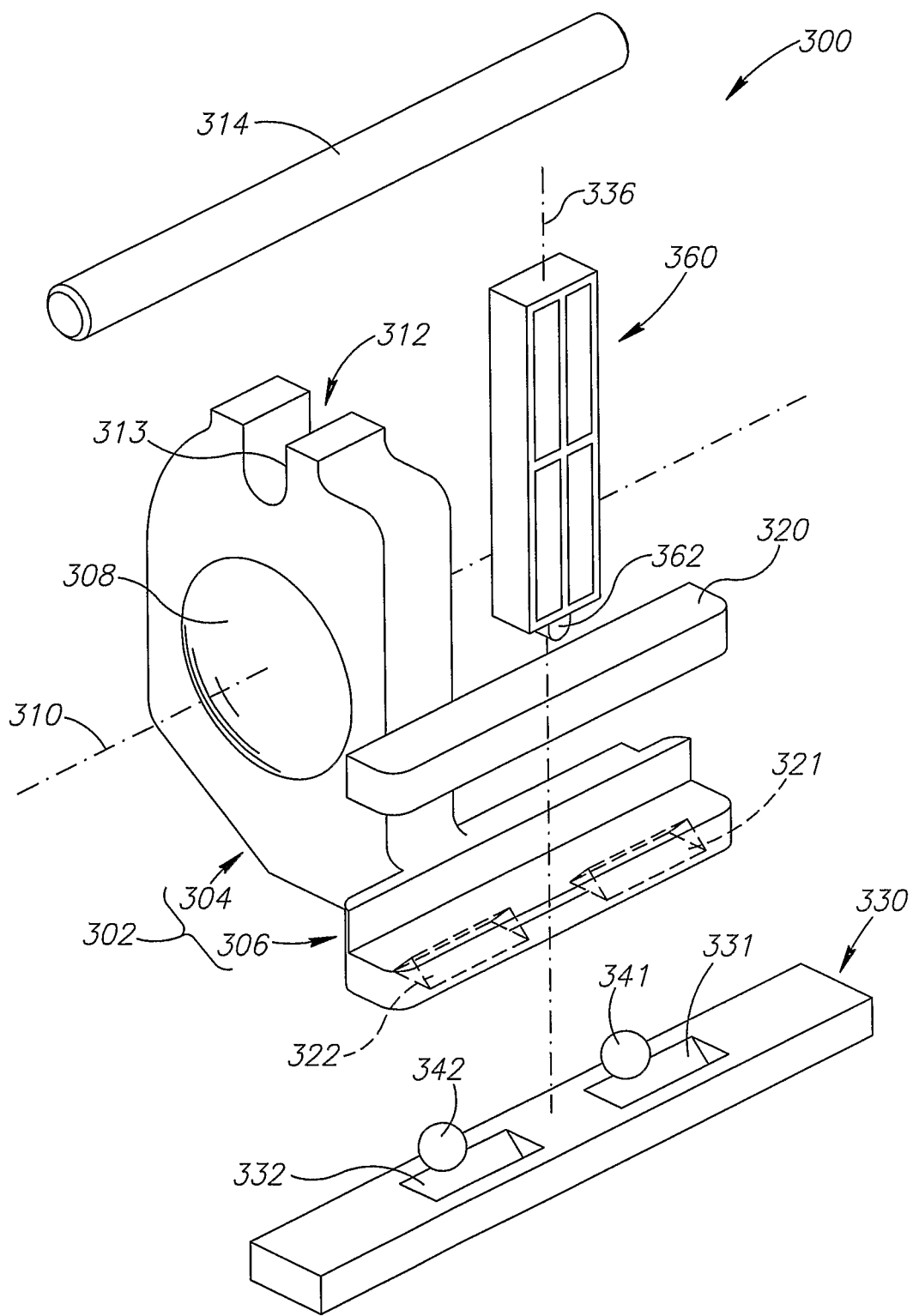
FIGS. 4A and 4B schematically show an exploded and assembled view respectively of a linear bearing array transport system for moving and positioning a lens, in accordance with an embodiment of the invention.
Figure 4B:
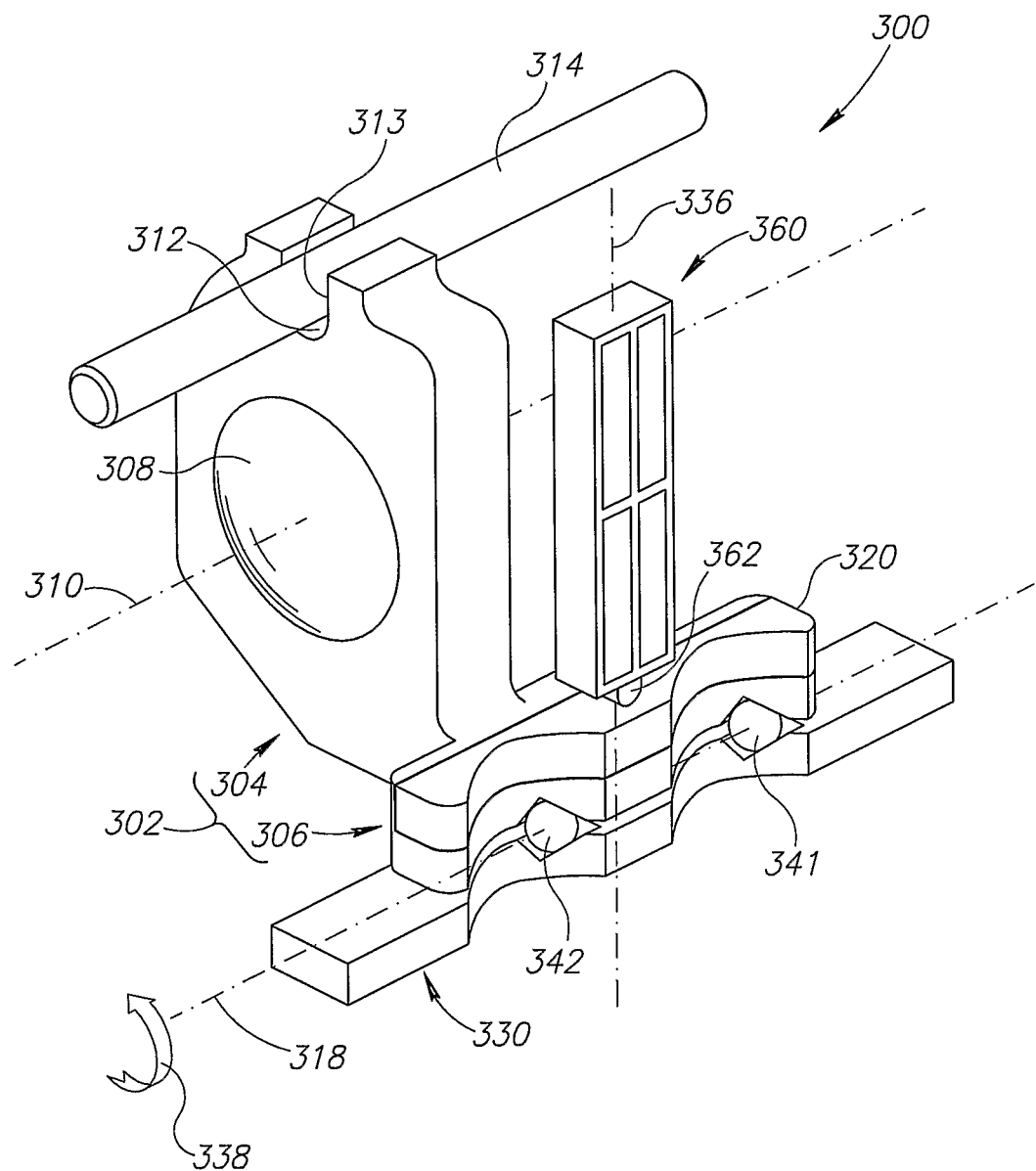

FIGS. 4A and 4B schematically show an exploded and assembled view of a linear bearing array transport system 300 for moving and positioning a lens, in accordance with an embodiment of the invention.

Transport system 300 comprises a lens platform 302 having a platform body 304 and an appendage 306 and is schematically shown mounted with a lens 308 having an optic axis 310. Platform body 304 is optionally formed having a slot 312 for receiving a guide rail 314. Appendage 306 is formed having, optionally two, substantially collinear grooves 321 and 322 indicated by dashed lines. A groove bar 330 is optionally formed having at least one groove corresponding to grooves 321 and 322 and is mounted to a suitable support frame or housing, such as a housing 382 of a camera 380 shown in FIG. 4C that includes transport system 300. By way of example groove bar 330 is formed having two grooves 331 and 332 corresponding to grooves 321 and 322 respectively. Grooves 321, 322, 331 and 332 are configured to receive ball bearings 341 and 342 and are optionally, as schematically shown in FIGS. 4A and 4B, V-grooves. When transport system 300 is assembled, as shown in FIG. 4B, ball bearing 341 is seated in and sandwiched between V-grooves 321 and 331 and ball bearing 342 is seated in and sandwiched between V-grooves 322 and 332. A line 318 through the centers of bearings 341 and 342 is parallel to optic axis 310, the lengths of V-grooves 321, 322, 331 and 332 and is a bearing array axis of transport system 300.

Groove appendage 306 has a contact bar 320 mounted thereto for coupling the groove appendage and thereby lens platform 302 to at least one piezoelectric motor 360. Piezoelectric motor 360 is optionally similar to piezoelectric motor 60 shown in FIG. 1C and is coupled to contact bar 320 by applying a "coupling" force to the motor so that its friction nub 362 presses on the contact bar. Piezoelectric motor 360 is mounted to the frame or housing to which groove bar 330 is mounted. Any of various methods and devices known in the art may be used to mount piezoelectric motor 360 to the frame or housing and apply coupling force that presses friction nub 362 to contact plate 320.

In accordance with an embodiment of the invention, the coupling force that presses friction nub 362 to contact bar 320 urges appendage 306 towards groove bar 330 to trap and maintain ball bearings 341 and 342 sandwiched between their respective V-groove pairs 321-331 and 322-332. When suitably mounted in a frame or housing (FIG. 4C), piezoelectric motor 360 and groove bar 330 substantially do not move relative to each other and an action line 336 along which the coupling force acts, is optionally equidistant from V-grooves 331 and 332 in the groove bar and is substantially perpendicular to bearing array axis 318. Optionally, action line 336 is displaced towards optic axis 310 of lens 308. Because of the displacement, the coupling force generates a torque that operates to rotate lens platform 302 about bearing array axis 318 in a counterclockwise direction indicated by circular block arrow 338 (FIG. 4B) so that a wall region 313 of slot 312 leans against guide rail 314. Force between wall region 313 of the slot and guide rail 314 generates a torque equal and opposite to the torque generated by force from friction nub 362 on contact plate 320 and net torque on lens platform 302 is equal to zero.

The dimensions and configuration of lens platform 302, guide rail 314 and groove bar 330 are such when wall region 313 leans against guide rail 314, appendage 306 does not touch groove bar 330. As a result, lens platform 302 is stably supported by contact only with ball bearings 341 and 342 and guide rail 314 and the ball bearings and low friction contact between lens platform 304 and guide rail 314 allow the lens platform to be relatively easily translated along either direction parallel to optic axis 310. When the lens platform moves in a given direction along optic axis 310, ball bearings 341 and 342 move in the given direction by rolling along the surfaces of their respective V-grooves. It is noted that with respect to V-grooves 331 and 332, when the lens platform is translated in a given direction, ball bearings 341 and 342 roll relative to the V-grooves in the same direction as the translation. On the other hand, relative to V-grooves 321 and 322 in appendage 306, which move with lens platform 302, the ball bearings roll in a direction opposite to the direction of translation of the lens platform.

Lens platform 302 is translated selectively in either direction along optic axis 310 and positioned at regions along the optic axis by appropriately controlling piezoelectric motor 360 so that friction nub 362 vibrates and applies force to contact surface 320 in the selected direction.

Figure 4C:
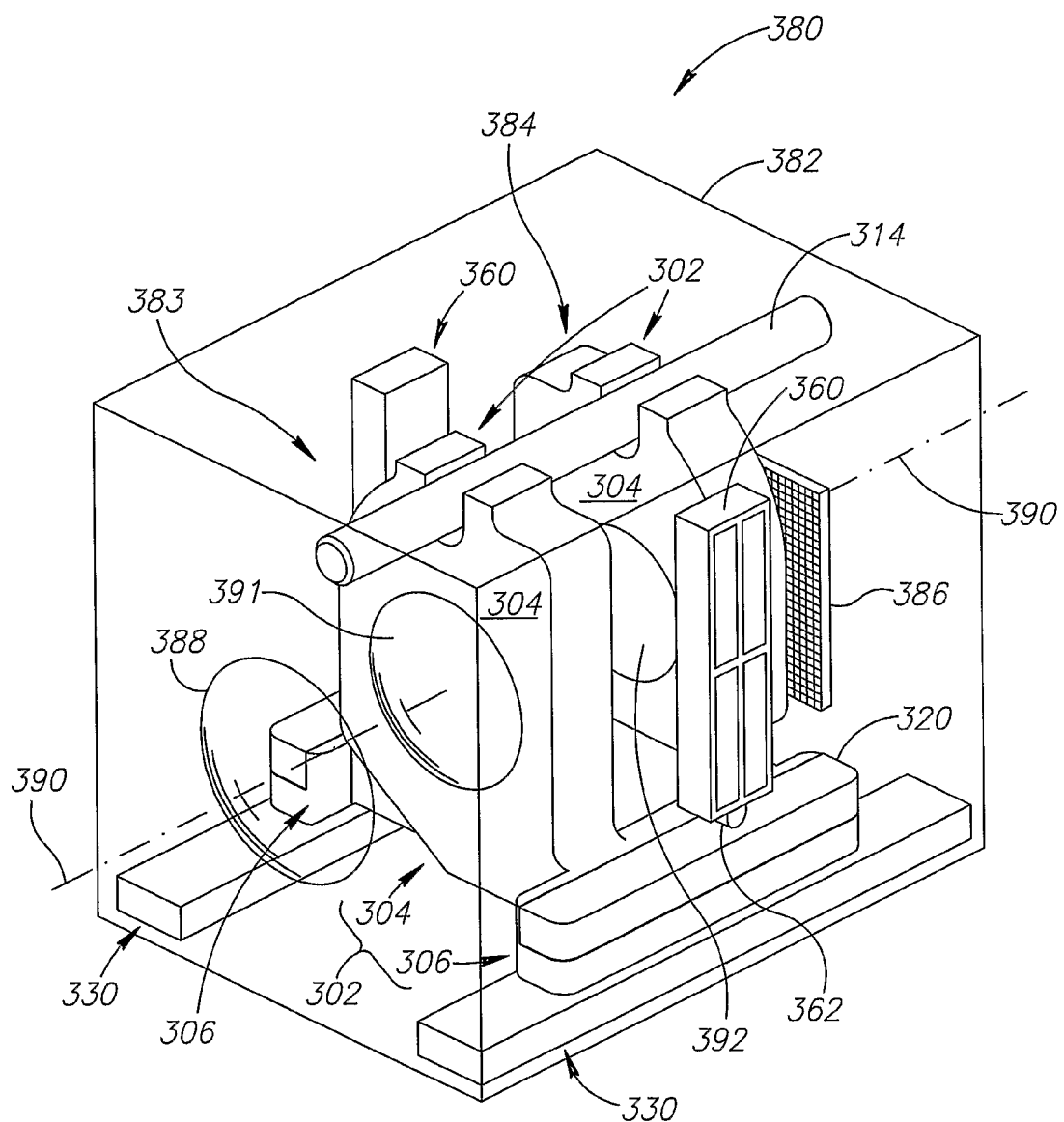
FIG. 4C schematically shows a camera comprising two linear bearing transport systems similar to those shown in FIGS. 4A and 4B, in accordance with an embodiment of the invention.

FIG. 4C schematically shows a camera 380 optionally comprising a camera housing 382, two lens transport systems 383 and 384 similar to lens transport system 300, a photosurface 386 and a collecting lens 388. A zoom lens system or lens 391 is mounted to lens platform 302 of lens transport system 383. A focusing lens 392 is mounted to lens platform 302 in lens transport system 384. Lens transport systems 383 and 384 share a same guide rail 314 and have optic axes substantially coincident with a camera optic axis 390 and are rotated relative to each other so that so that their respective appendages 306 and groove bars 330 are on opposite sides of camera housing 382. Groove bars 330 and piezoelectric motors 360 of lens transport systems 383 ad 384 are mounted to housing 382 using any of various methods and device known in the art. Piezoelectric motors 360 of lens transport systems 383 and 384 are operated to move and position zoom lens 391 and focusing lens 392 respectively along camera optic axis 390 to provide zoom and focusing functions for camera 380.

The inventors have found that lens transport systems similar to lens transport systems 300, 383 and 384 are relatively compact and that a camera similar to camera 380 comprising such lens systems in accordance with an embodiment of the invention can be made relatively small. By way of example, the inventors have found that it is possible to make a camera similar to camera 380 that provides zoom and focusing functions that has a cross section perpendicular to the camera optic axis of about 10 mm by 10 mm and lenses having diameters of about 5.5 mm.

Figure 5A:
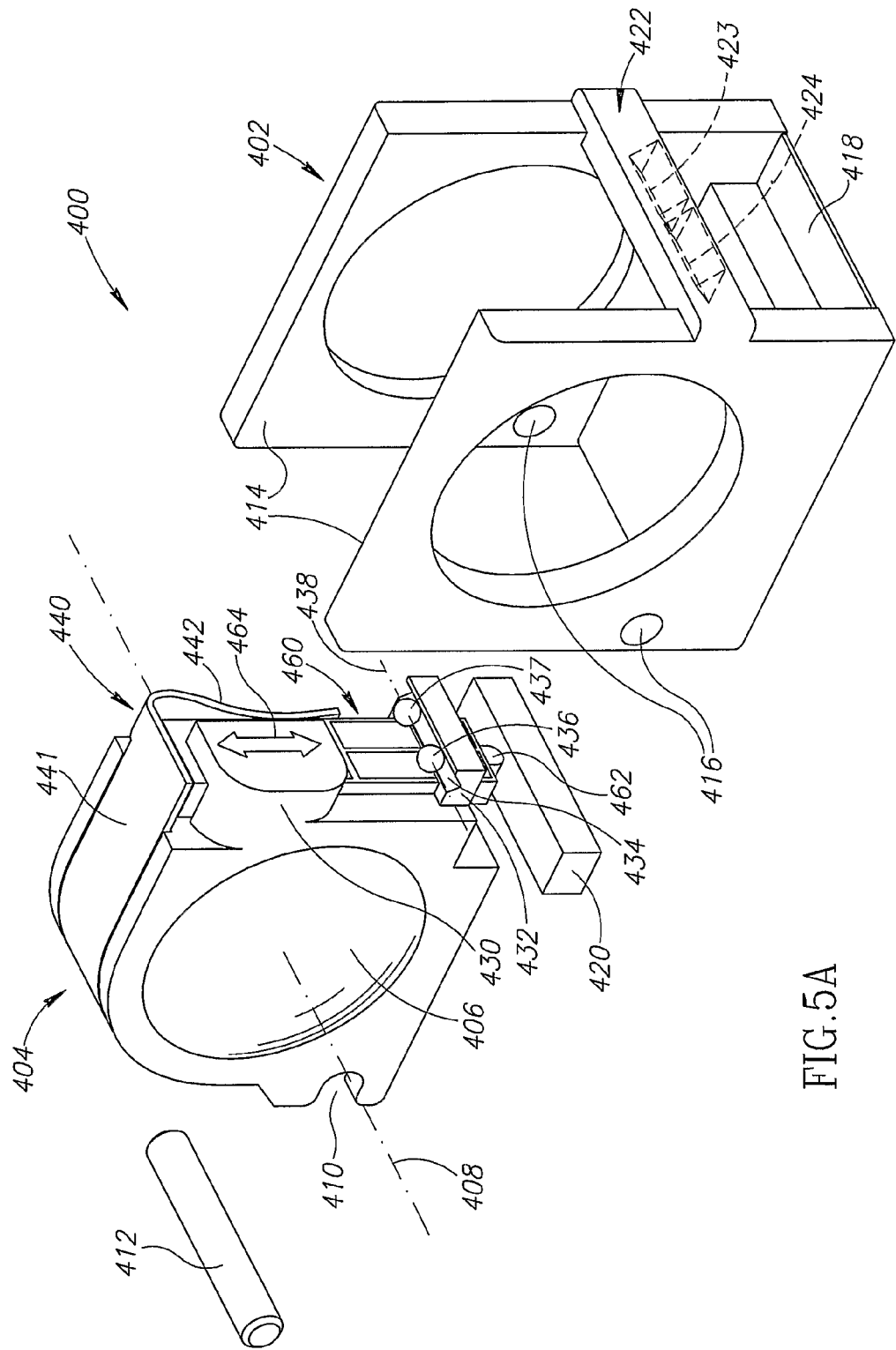
FIGS. 5A and 5B schematically show an exploded and assembled view respectively of another linear bearing array transport system for moving and positioning a lens, in accordance with an embodiment of the invention.
Figure 5B:
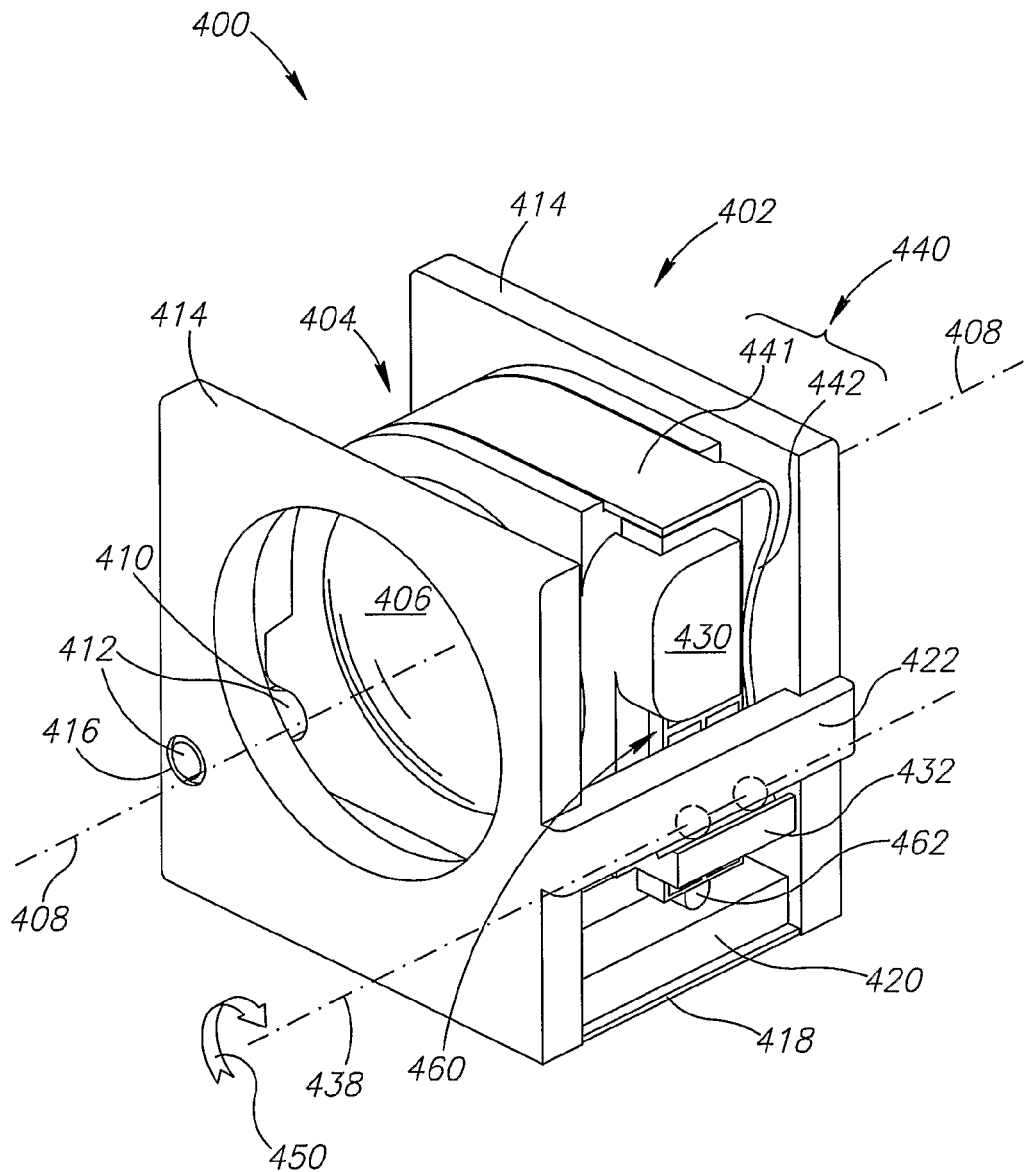

FIGS. 5A and 5B schematically show an exploded and assembled view of a linear bearing array transport system 400 for moving and positioning a lens, in accordance with an embodiment of the invention.

Transport system 400 comprises a transport support frame 402 and a lens platform 404 schematically shown mounted with a lens 406 having an optic axis 408. Lens platform 404 is formed having a guide rail slot 410 for receiving a guide rail 412 having a low friction surface. Support frame 402 optionally comprises two side panels 414 formed having holes 416 for receiving the guide rail, a shelf 418 for supporting a contact plate 420 and a cross bar 422 that connects and supports two side panels 414.

Whereas in linear bearing array transport system 400 (FIGS. 4A-4C) a piezoelectric motor 360 is mounted to a support frame or housing, e.g. housing 382 (FIG. 4C), and not to lens platform 302 of the transport system, in transport system 400 a piezoelectric motor 460 is mounted to lens platform 404 and not to support frame 402. Piezoelectric motor 460 is held to lens platform 404 optionally by an open sided bracket 430, a U-shaped bracket 432 and a leaf spring 440 having a leaf 441 and a tine 442 extending from the leaf. Open sided bracket 430 and U-shaped bracket 432 are shaped and dimensioned so that they do not hold piezoelectric motor 460 fast, but allow the motor to move in directions indicated by a double headed block arrow 464. Tine 442 presses piezoelectric motor 460 into open-sided bracket 430 and leaf spring 441 presses the motor in a direction so that a friction nub 462 of the motor contacts contact plate 420. U-shaped bracket 432 is formed having a groove 434, optionally a V-groove, for receiving optionally two ball bearings 436 and 437 having a bearing array axis 438. Cross bar 422 is formed having two optionally V-grooves 423 and 424 for receiving respectively ball bearings 437 and 436.

When assembled, as shown in FIG. 5B, contact plate 420 is mounted to shelf 418 of support frame 402 and lens platform 404 inserted into the frame between panels 414 so that friction nub 462 is resiliently forced to contact the contact plate by action of leaf 441. Guide rail 412 is inserted into holes 416 and passes through slot 410 in lens platform 404. Force between the contact plate and the friction nub urges U-shaped bracket 432 of lens platform 404 towards cross bar 422 to trap and sandwich ball bearing 436 between V-groove 434 of U-shaped bracket 432 and V-groove 424 (FIG. 5A) of cross bar 422 and ball bearing 437 between V-groove 434 and V-groove 423.

In accordance with an embodiment of the invention, an action line of the force that friction nub 462 applies to contact surface 420 does not pass through bearing array axis 438 (FIG. 5A) but is displaced towards optic axis 408. As a result, the force generates a torque that rotates lens platform 404 counterclockwise in a direction indicated by a curved block arrow 450. In an embodiment of the invention, as in linear bearing transport system 400, in linear transport system 400 the torque causes lens platform 404 to lean on guide rail 412 so that the lens platform is supported only by contact with ball bearings 436 and 437 and the guide rail. Orientation of lens platform is therefore stably maintained, and the lens platform and lens 406 are relatively easily moved in selectively in directions along its optic axis 408 by controlling piezoelectric motor 460 to apply force to contact plate 420.

Figure 5C:
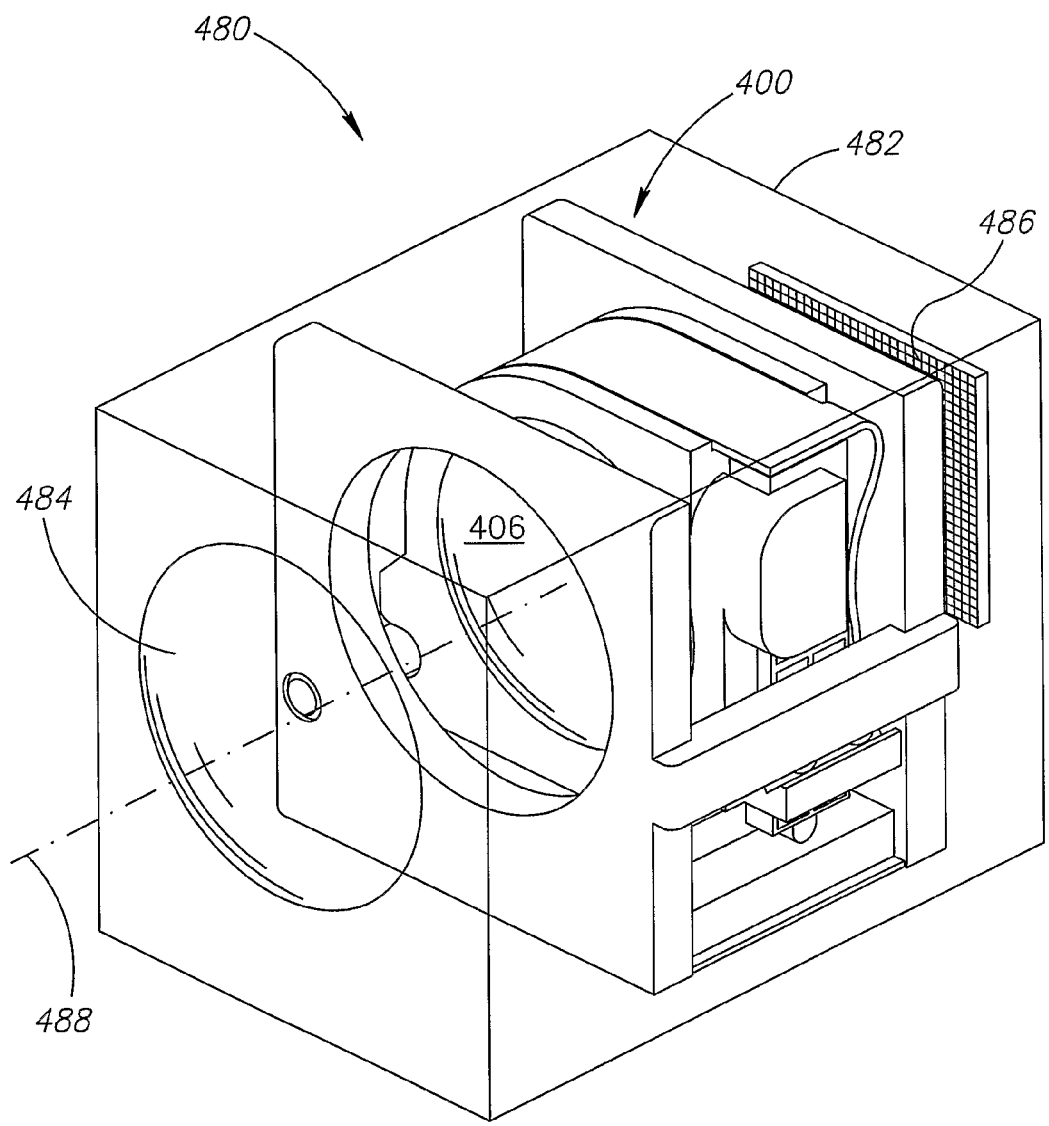
FIG. 5C schematically shows a camera comprising the linear bearing transport system shown in FIGS. 5A and 5B, in accordance with an embodiment of the invention.

FIG. 5C schematically shows linear bearing transport system 400 and lens 406 comprised in a camera 480, in accordance with an embodiment of the invention. The transport system is mounted in a camera housing 482 optionally having a collecting lens 484 and a photosurface 486 so that the optic axis 408 (FIGS. 4A and 4B) of lens 406 and an optic axis 488 of the camera coincide. By way of example lens 406 functions as a focusing lens and is moved along optic axis 488 by force applied by piezoelectric motor 460 to contact block 420.

The inventors have found that a camera similar to camera 480 in accordance with an embodiment of the invention can be made having relatively small dimension. By way of example, the inventors have found that it is possible to make a camera similar to camera 480 that satisfies the SMIA85 standard and has a cross section perpendicular to the camera optic axis of about 8.5 mm by 8.5 mm and lenses having a diameter of about 5.5 mm.

Figure 6:
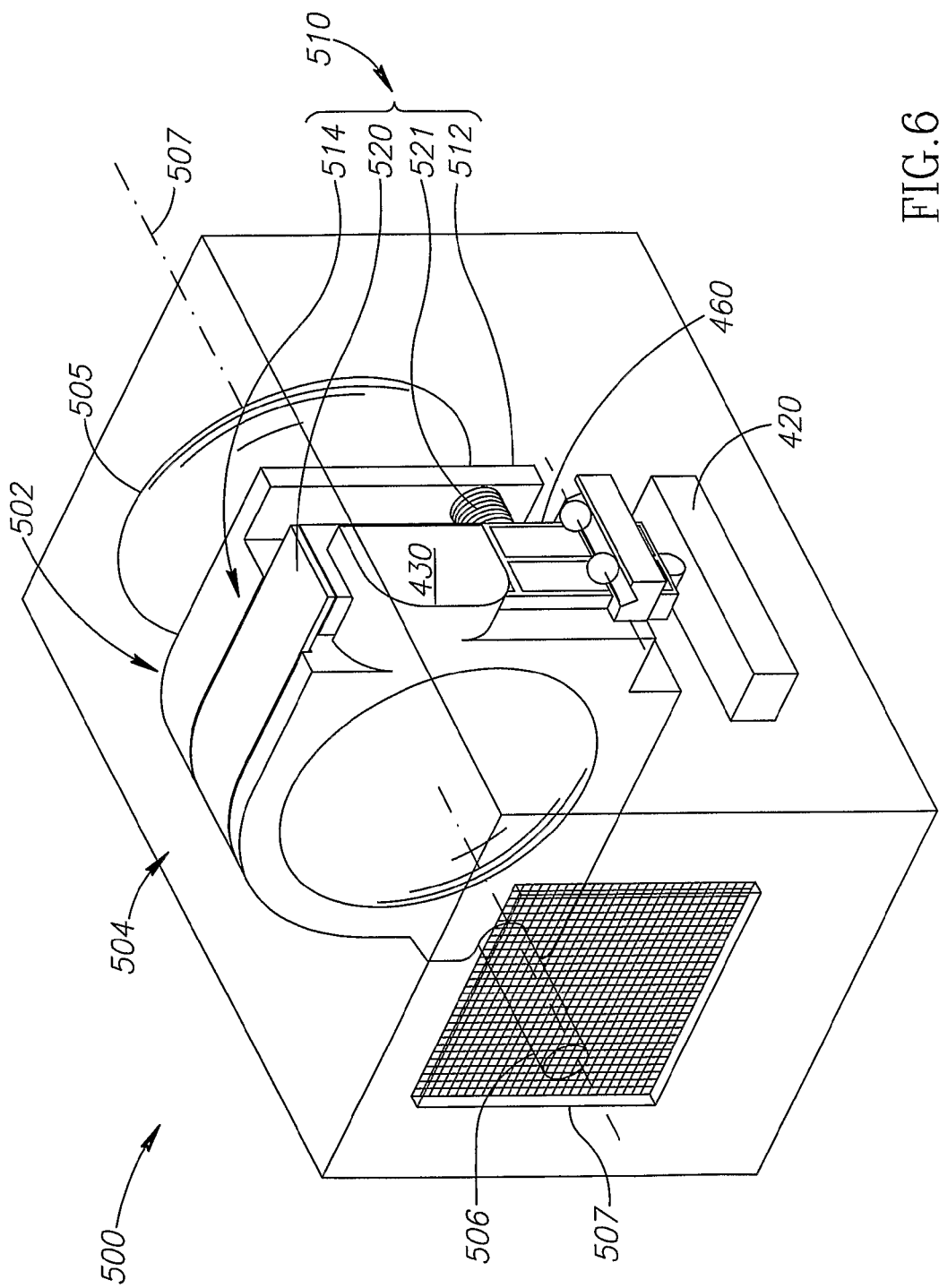
FIG. 6 schematically shows a perspective view of another camera comprising a linear bearing array transport system, in accordance with an embodiment of the invention.

FIG. 6 schematically shows a perspective view of another camera 500 comprising a linear bearing array transport system 502 in accordance with an embodiment of the invention. Linear bearing transport system 502 is mounted in a camera housing 504 using a suitable transport support frame (not shown) similar to transport support frame 402 comprised in linear bearing transport system 400 shown in FIG. 5A. Camera housing 504 optionally comprises a collecting lens 505 aligned with a photosurface 506 along an optic axis 507 of the camera.

Linear lens transport system 502 is similar to lens transport system 400 shown in FIGS. 5A-5C but comprises a lens platform 510 in which piezoelectric motor 460 is held to platform 510 differently from the way piezoelectric motor 460 is held to platform 404 of lens transport system 400. Platform 510 comprises separate independent resilient elements, optionally a leaf spring 520 and a coil spring 521, to respectively urge motor 460 into open sided bracket 430 and contact plate 420. The separate leaf and coil springs 520 and 521 replace single element leaf spring 440 (FIG. 5A) comprising a leaf 441 and a tine 442 integral with the leaf that operate to urge motor 460 into the open sided bracket and to the contact plate in platform 404. In an embodiment of the invention, platform 510 comprises a base plate 512 that functions to support coil spring 521 and serves as a panel against which the spring presses in order to urge motor 460 into open bracket 430. Optionally, base plate 512 extends from a lens mount 514 comprised in platform 510 to which at least one camera lens (not shown) that is moved and positioned by the platform is mounted.

Figure 7A:
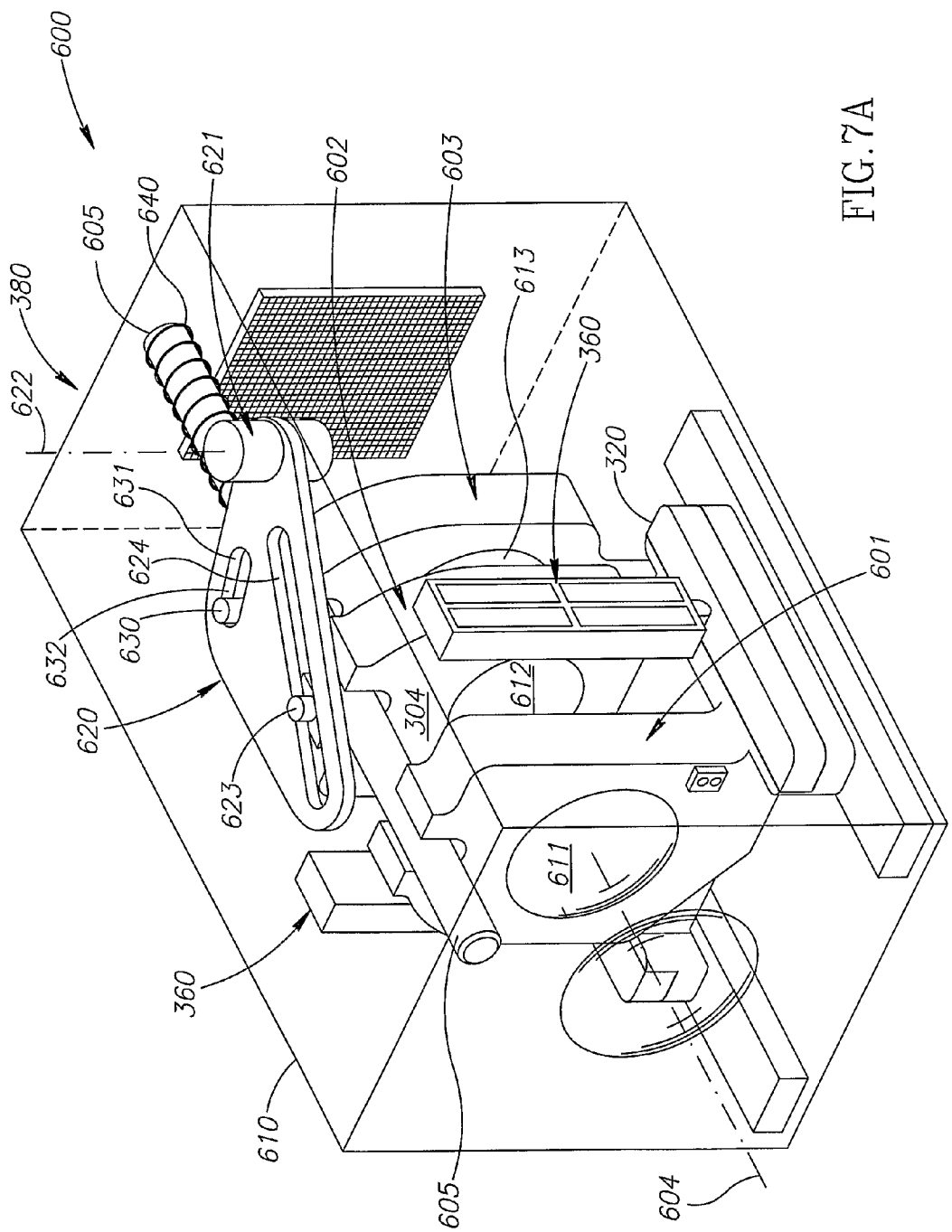
FIGS. 7A and 7B schematically show perspective and plan views respectively of a camera similar to that shown in FIG. 4C but comprising an additional lens platform, in accordance with an embodiment of the invention.
Figure 7B:
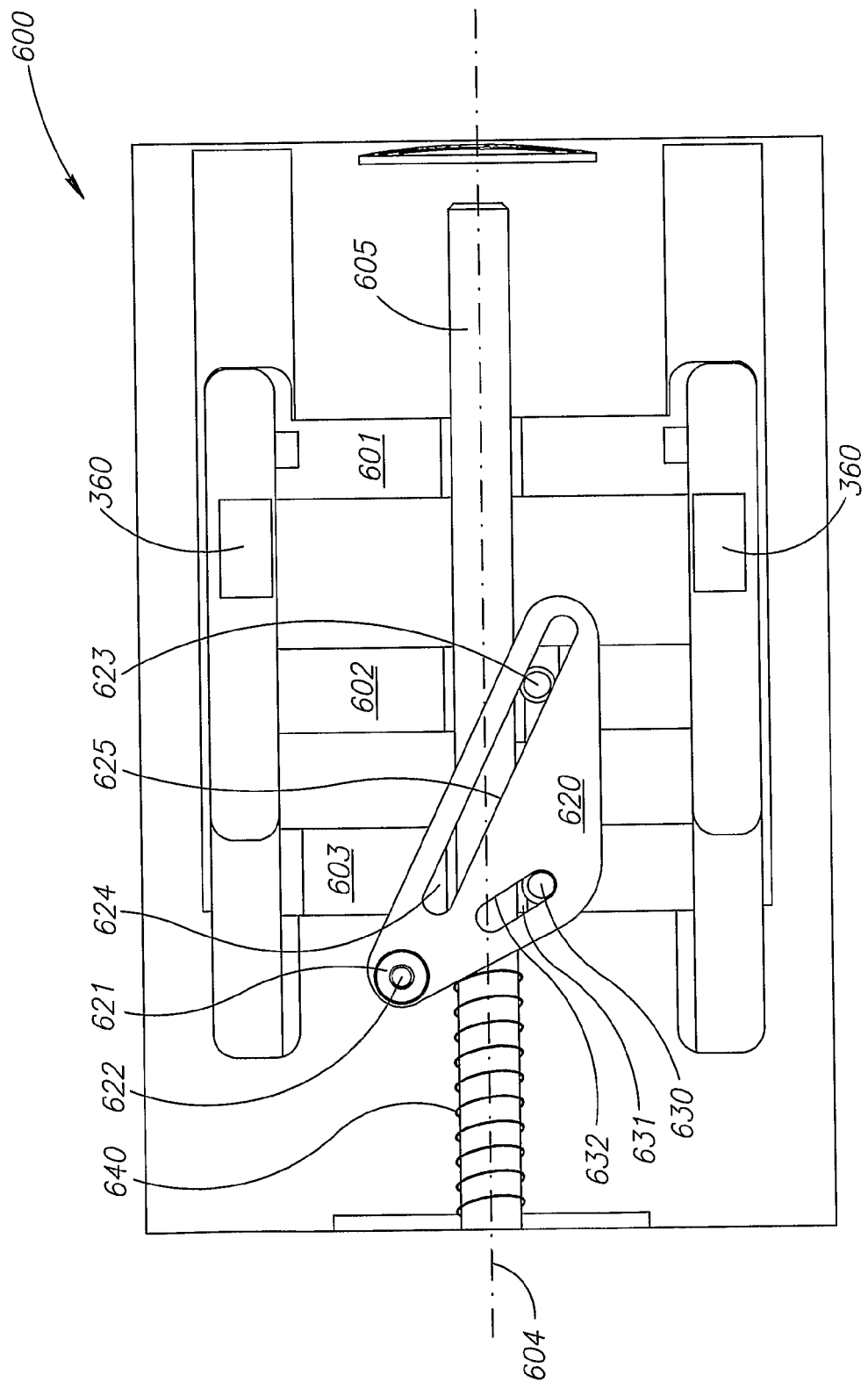

FIGS. 7A and 7B schematically show perspective and plan views respectively of a camera 600 similar to camera 380 (FIG. 4C) that comprises lens platforms 601 and 602 similar to lens platforms 302 of camera 380 and in addition, a lens platform 603, in accordance with an embodiment of the invention. Components of camera 600 are comprised in a housing 610.

Lens platforms 601, 602 and 603 are mounted with lenses 611, 612 and 613 respectively that optionally share a common optic axis 604. Whereas lens platforms 601 and 602 are optionally moved and positioned along optic axis 604 to focus camera 600 and/or to provide a zoom function, by their own piezoelectric motors 360, lens platform 603 on the other hand is a "dependent" platform. Platform 603 is mechanically coupled to lens platform 2602 and does not have its own motor for moving and positioning the platform along optic axis 604. The mechanical coupling between platforms 602 and 603 automatically moves and positions lens platform 602 as a function of motion and position of lens platform 602.

In some embodiments of the invention, as shown in FIGS. 7A and 7B, platforms 601 and 602 are mounted to a single guide rail 605 and are stabilized in a mounting configuration that provides low friction motion of the platforms along optic axis 604, similarly to the manner in which lens platforms 302 in camera 380 are mounted and stabilized. Dependent lens platform 603 is aligned with optic axis 604 and constrained to move along the optic axis using any of various methods and devices known in the art. Optionally, platform 603, is mounted to guide rail 605 to align platform 603 with optic axis 604. Optionally platform 603 is also mounted to a second guide rail (not shown) parallel to guide rail 605 to stabilize orientation of platform 603 relative to optic axis 604 and prevent rotation of the platform relative to the optic axis. In some embodiments of the invention, each of lens platforms 601, 602 and 603 is mounted to same at least two guide shafts that maintain the platforms stably aligned with optic axis 604.

In accordance with an embodiment of the invention, dependent platform 603 is mechanically coupled to platform 602 by a cam 620 coupled to a pin 621, which is optionally mounted to camera housing 610 so that the cam is freely rotatable about an axis 622 of the pin. Cam 620 is coupled to platform 602 by a pin 623 comprised in the platform, which pin seats in an optionally straight slot 624 formed in the cam. The cam is coupled to platform 603 by a pin 630 comprised in the platform, which pin seats in an optionally straight slot 631 formed in the cam. In accordance with an embodiment of the invention, a relative angle between slot 624 and slot 631 is determined so that as piezoelectric motor 360 is operated to move and position lens platform 602, lens platform 603 is correspondingly moved and positioned relative to lens platform 602 so that lenses 612 and 613 cooperate to provide a desired optical function. Optionally, the lenses cooperate to provide a desired zoom function for camera 600.

In accordance with an embodiment of the invention, a bias spring, optionally a coil spring 640, is mounted to at least one guide rail 605 and operates to resiliently urge lens platform 603 towards lens platform 602. The resilient force generated by bias spring 640, urges pin 630 to butt up against edge 632 of slot 631 and pin 623 to butt up against an edge 625 of slot 624. As a result, edges 632 and 625 and associated pins 630 and 623 function to provide relatively accurate registration of movement and positioning of lens platform 603 relative to lens platform 602 and reduce backlash that might erode accuracy of movement and positioning of lens platform 603.

In the description and claims of the application, each of the words "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. A zoom lens apparatus comprising:
a lens;
a moveable platform to which the lens is mounted;
ball bearings that move in a direction in which the platform moves when the platform moves;
linear grooves in which the ball bearings are disposed;
a piezoelectric motor having a friction nub and controllable to excite vibrations in the nub to generate force for moving the moveable platform;
a surface to which the friction nub applies the force;
and a resilient element, which generates a coupling force that presses the friction nub to the surface and operates to trap and maintain the ball bearings in the grooves.

2. The apparatus according to claim 1 wherein the grooves are V-grooves.

3. The apparatus according to claim 1 wherein a line of action of the coupling force is displaced from the direction along which the bearings move.

4. The apparatus according to claim 1 wherein the surface is a surface that moves with the platform.

5. The apparatus according to claim 1 wherein the surface is separate from the platform.

6. The apparatus according to claim 1 wherein the surface does not move when the platform moves.

7. The apparatus according to claim 1 wherein the motor is mounted to the platform and moves with the platform.

8. The apparatus according to claim 1 wherein the platform comprises a first elastic element that presses the motor to the platform and a second elastic element separate from the first element that presses the friction nub to the surface.

9. The apparatus according to claim 1 further comprising a second lens platform having a second lens, wherein the second lens platform is mechanically coupled to the first platform and adapted so that motion and position of the first platform along the optic axis can control motion and position of the first platform along the optic axis.

10. The apparatus according to claim 9 wherein the second lens platform comprises a cam that mechanically couples the second platform to the first platform.

11. The apparatus according to claim 10 wherein the cam is formed having first and second slots and the first and second platforms respectively comprise first and second parallel pins perpendicular to the optic axis that seat in the first and second slots and about which pins the cam is rotatable.

12. The apparatus according to claim 10 further comprising a fixed shaft having an axis about which the cam is rotatable.

13. The apparatus according to claim 11 wherein the first and second slots are straight slots.

* * * * *